United States Patent
Yang et al.

(10) Patent No.: US 12,107,921 B2
(45) Date of Patent: *Oct. 1, 2024

(54) INTERNET OF THINGS SYSTEM

(71) Applicant: Merry Electronics(Shenzhen) Co., Ltd., ShenZhen (CN)

(72) Inventors: Yun Han Yang, Taichung (TW); Hsin Jia Huang, Taichung (TW); Yi Lin Hsieh, Taichung (TW)

(73) Assignee: Merry Electronics (Shenzhen) Co., Ltd., ShenZhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/306,238

(22) Filed: Apr. 25, 2023

(65) Prior Publication Data

US 2023/0262130 A1  Aug. 17, 2023

Related U.S. Application Data

(63) Continuation-in-part of application No. 17/472,496, filed on Sep. 10, 2021, now Pat. No. 11,671,500.

(51) Int. Cl.
*H04L 12/24* (2006.01)
*H04L 41/0803* (2022.01)
*H04L 67/12* (2022.01)
*H04L 67/55* (2022.01)
*G16Y 40/35* (2020.01)

(52) U.S. Cl.
CPC .............. *H04L 67/12* (2013.01); *H04L 67/55* (2022.05); *G16Y 40/35* (2020.01)

(58) Field of Classification Search
CPC ........ H04L 67/12; H04L 67/55; H04L 67/125; G16Y 40/35
USPC ........................................................ 709/223
See application file for complete search history.

(56) References Cited

U.S. PATENT DOCUMENTS

| | | | |
|---|---|---|---|
| 10,185,598 B2* | 1/2019 | Wang | G06F 9/5088 |
| 2020/0177517 A1* | 6/2020 | Pancras | H04W 4/70 |
| 2022/0058306 A1* | 2/2022 | Mabote | G06F 30/18 |
| 2022/0113705 A1* | 4/2022 | Thomsen | G06Q 50/04 |

* cited by examiner

*Primary Examiner* — Ario Etienne
*Assistant Examiner* — Elizabeth Kassa
(74) *Attorney, Agent, or Firm* — JCIPRNET

(57) ABSTRACT

An Internet of Things (IoT) system includes a plurality of terminal devices, a cloud device and a human machine interface (HMI) device. The cloud device is communicatively connected to the terminal devices. The human machine interface (HMI) device is communicatively connected to the terminal devices via a plurality of first communication channels, and communicatively connected to the cloud device via a first dedicated communication channel. The HMI device determines a subscription sequence according to priority information of a plurality of control commands, and schedules and dynamically subscribes to the first communication channels according to the subscription sequence. The HMI device respectively determines whether the terminal devices are adjacent to the HMI device, and transmits switch transmission mode request messages corresponding to the terminal devices adjacent to the HMI device to the cloud device via the first dedicated communication channel.

19 Claims, 16 Drawing Sheets

INTERNET OF THINGS SYSTEM

CROSS-REFERENCE TO RELATED APPLICATION

This application is a continuation-in-part application of and claims the priority benefit of U.S. application Ser. No. 17/472,496, filed on Sep. 10, 2021, which claims the priority benefit of Taiwan patent application Ser. No. 110129999, filed on Aug. 13, 2021. The entirety of each of the above-mentioned patent applications is hereby incorporated by reference herein and made a part of this specification.

BACKGROUND

Technical Field

The disclosure relates to a communication architecture, and in particular to an Internet of Things system.

Description of Related Art

The architecture of a traditional Internet of Things (IoT) system may be built based on the Message Queuing Telemetry Transport (MQTT) protocol. The terminal device of the traditional IoT system establishes a connection with a cloud server through a channel with a Universally Unique Identifier (UUID). In this regard, the terminal device transmits and receives data through this channel, and a human machine interface device controls the terminal device through this channel. However, when the number of terminal devices increases and exceeds the limit of the number of subscription channels, the traditional IoT system cannot efficiently manage or control a large number of terminal devices at the same time, and the computing load of the human machine interface device may even exceeds the load limit, causing security concerns on the user side. Therefore, efficiently managing or controlling a large number of terminal devices when the number of subscription channels is limited is one of the important directions of research in the field of IoT.

SUMMARY

An IoT system in the disclosure includes multiple terminal devices, a cloud device, and a human machine interface device. The cloud device is communicatively connected to the terminal devices. The human machine interface device is communicatively connected to the cloud device via multiple first communication channels, and is adapted for determining a subscription sequence according to priority information of multiple control commands. The human machine interface device schedules and dynamically subscribes to the first communication channels according to the subscription sequence, so as to transmit the control commands to the cloud device via different first communication channels according to the subscription sequence, so that the cloud device transmits the control commands to the corresponding terminal devices.

An IoT system in the disclosure includes multiple terminal devices, a cloud device, and a human machine interface device. The cloud device is communicatively connected to the terminal devices. The human machine interface (HMI) device is communicatively connected to the terminal devices via a plurality of first communication channels, and communicatively connected to the cloud device via a first dedicated communication channel. The HMI device determines a subscription sequence according to priority information of a plurality of control commands, and schedules and dynamically subscribes to the first communication channels according to the subscription sequence. The HMI device respectively determines whether the terminal devices are adjacent to the HMI device, and transmits switch transmission mode request messages corresponding to the terminal devices adjacent to the HMI device to the cloud device via the first dedicated communication channel.

Based on the above, the IoT system of the disclosure efficiently schedules and dynamically subscribes to multiple first communication channels to transmit multiple control commands to the cloud device by determining the priority sequence of the control commands. The cloud device transmits the control commands to multiple corresponding terminal devices. Therefore, the IoT system of the disclosure effectively controls a large number of terminal devices. Moreover, the HMI device of the IoT system may switch to the regional transmission mode to manage and control the terminal device adjacent to the HMI device with lower delay and low power consumption.

To provide a further understanding of the above features and advantages of the disclosure, embodiments accompanied with drawings are described below in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
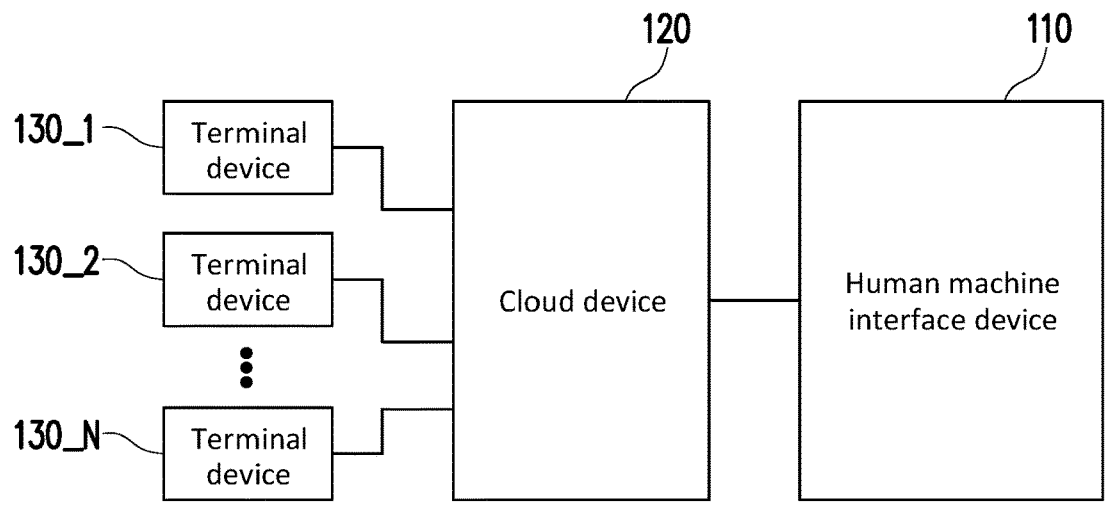
FIG. 1 is a schematic diagram of an Internet of Things (IoT) system according to an embodiment of the disclosure.

To provide a further understanding of the content of the disclosure, the following embodiments are used as examples based on which the disclosure may be realized. In addition, wherever possible, elements/components/steps with the same reference numeral in the drawings and embodiments represent the same or similar components.

FIG. 1 is a schematic diagram of an Internet of Things (IoT) system according to an embodiment of the disclosure. Referring to FIG. 1, an Internet of Things (IoT) system 100 includes a human machine interface device 110, a cloud device 120, and a plurality of terminal devices 130_1 to 130_N, where N is a positive integer. In this embodiment, the cloud device 120 may be communicatively connected to the terminal devices 130_1 to 130_N. The human machine interface (HMI) device 110 may establish a plurality of first communication channels to be communicatively connected to the cloud device 120. The cloud device 120 may establish a plurality of second communication channels to be communicatively connected to the terminal devices 130_1 to 130_N. The number of first communication channels is limited, and the number of second communication channels may be greater than or equal to the number of first communication channels. It is worth noting that the number of terminal devices 130_1 to 130_N is greater than the number of the first communication channels. The human machine interface device 110 may also establish a first dedicated communication channel to be communicatively connected to the cloud device 120, and the cloud device 120 may establish one or more second dedicated communication channels to be communicatively connected to the terminal devices 130_1 to 130_N.

In addition, in an embodiment, the IoT system 100 may be, for example, applied to a home energy management system (HEMS), and manages the terminal device 130_1 to 130_N. The terminal devices 130_1 to 130_N may include, for example, corresponding to one or more IoT appliances in users' homes such as a solar appliance, a household appliance, and a related utility device. However, the application of the IoT system 100 of this embodiment is not limited to a household energy management system.

In this embodiment, the human machine interface device 110 may be a display device that may provide monitoring and control functions for users, and may install a corresponding application (app) or may execute a corresponding web program, and may be, for example, a smart phone, a tablet computer, and a notebook computer, and the disclosure is not limited thereto. In this embodiment, the human machine interface device 110 may determine a subscription sequence according to priority information of a plurality of control commands, and may schedule and dynamically subscribe to a plurality of first communication channels according to the subscription sequence to transmit the control commands to the cloud device 120 via different first communication channels according to the subscription sequence, so that the cloud device 120 may transmit the control commands to the corresponding terminal devices 130_1 to 130_N via different second communication channels. In addition, the terminal devices 130_1 to 130_N may respectively return a plurality of corresponding IoT messages to the cloud device 120 via different second communication channels, so that the cloud device 120 may transmit the corresponding IoT messages to the human machine interface device 110. In this way, the human machine interface device 110 may effectively control and monitor the terminal devices 130_1 to 130_N. In addition, the IoT messages of this embodiment may respectively include, for example, at least one of device status information, sensing data, and a reply command.

Figure 2:
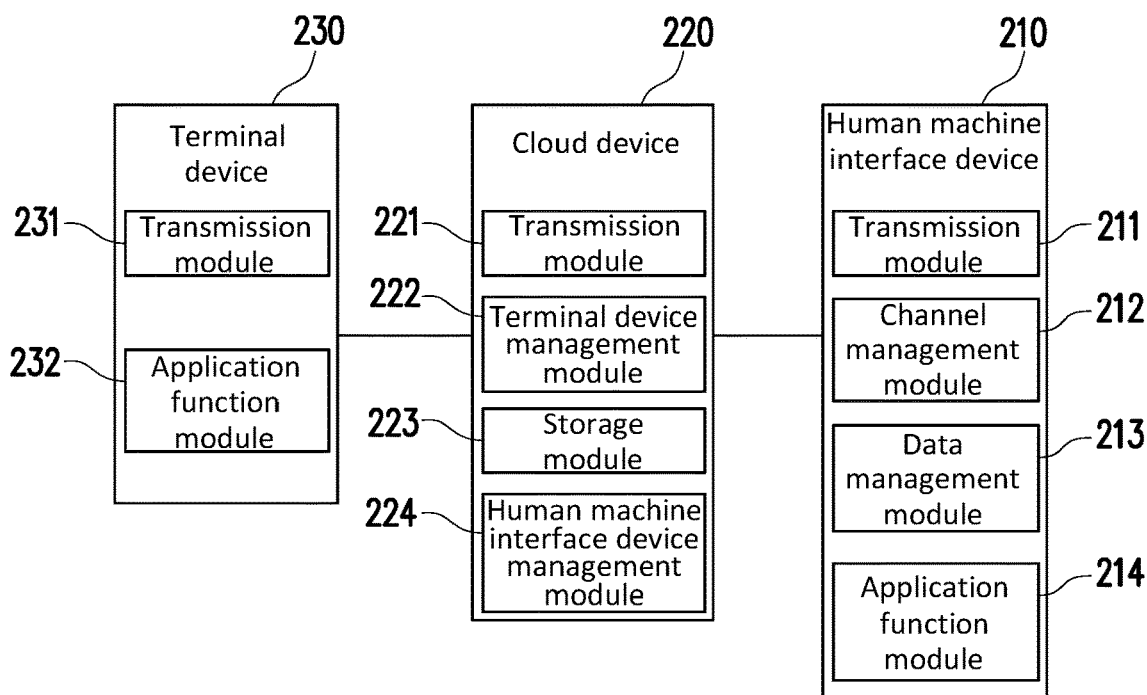
FIG. 2 is a schematic diagram of an IoT system according to another embodiment of the disclosure.

FIG. 2 is a schematic diagram of an IoT system according to another embodiment of the disclosure. Referring to FIG. 2, an IoT system 200 includes a human machine interface device 210, a cloud device 220, and a terminal device 230. This embodiment is described by taking the terminal device 230 as an example, and each of the terminal devices 130_1 to 130_N in FIG. 1 respectively realizes the terminal device 230 in FIG. 2. In this embodiment, the human machine interface device 210 may include a transmission module 211, a communication management module 212, a data management module 213, and an application function module 214. In this embodiment, the cloud device 220 may include a transmission module 221, a terminal device management module 222, a storage module 223, and a human machine interface device management module 224. The terminal device 230 may include a transmission module 231 and an application function module 232. In this embodiment, the human machine interface device 210, the cloud device 220, and the terminal device 230 may respectively include a processor and a memory corresponding to their own device specifications, and the memories may respectively be used to store the modules mentioned above for the processors to respectively access and perform related functions. In this regard, the above modules may be realized in the form of software or firmware combined with hardware circuits, and the processors may respectively execute corresponding algorithms to realize related functions thereof.

In this embodiment, the transmission modules 211, 221, and 231 may be realized based on the Message Queuing Telemetry Transport (MQTT) communication protocol, and may include a wired or wireless transport interface to realize the communicative connection and message sending and receiving between the human machine interface device 210, the cloud device 220, and the terminal device 230. The transmission module 211 of the human machine interface device 210 may be communicatively connected to the transmission module 221 of the cloud device 220, and may transmit and receive messages based on the MQTT communication protocol. The transmission module 221 of the cloud device 220 may be communicatively connected to the transmission module 231 of the terminal device 230, and may transmit and receive messages based on the MQTT communication protocol.

In this embodiment, the channel management module 212 of the human machine interface device 210 may schedule and allocate the subscription to the first communication channels corresponding to different terminal devices in a limited number of channels to perform transport of different control commands. In this embodiment, the data management module 213 of the human machine interface device 210 may further use a first dedicated communication channel to receive an organized message of a plurality of terminal devices transmitted by the cloud device 220, and may transmit a request control command. In this embodiment, the cloud device 220 may organize a plurality of IoT messages of at least a portion of a plurality of terminal devices to generate the organized message. In this embodiment, the application function module 214 of the human machine interface device 210 may display a user interface with an operation screen and related functions on the display screen of the human machine interface device 210, so that users may control and monitor a plurality of terminal devices through the human machine interface device 210.

In this embodiment, the terminal device management module 222 of the cloud device 220 may classify the control commands provided by the human machine interface device 210 and a plurality of IoT messages returned by the terminal devices 230, and may further explore the first dedicated communication channel connecting to the human machine interface device 210 and the second dedicated communication channel connecting to a plurality of terminal devices, and may perform a message push operation. In this embodiment, the storage module 223 of the cloud device 220 may, for example, use a binary tree data structure technology to store a plurality of connection messages and a plurality of IoT messages of a plurality of terminal devices, and may further temporarily store the control commands provided by the human machine interface device 210. In this embodiment, the human machine interface device management module 224 of the cloud device 220 may manage the connection status of a plurality of terminal devices and the schedule of related message pushes.

In this embodiment, the application function module 232 of the terminal device 230 may realize specific application functions (such as the sensing function of a certain sensor), and may generate an IoT message corresponding to a specific application function, and transmit the IoT message to the cloud device 220 via the corresponding second communication channel or the corresponding second dedicated communication channel. The application function module 232 of the terminal device 230 may also receive the corresponding control command and the request control command from the cloud device 220 via the corresponding second communication channel or the corresponding second dedicated communication channel, so as to perform a corresponding operation according to the control command or the request control command. In addition, the implementation method of the aforementioned modules will be described in detail by the following exemplary embodiments of schematic diagrams of operations in FIGS. 3 to 8.

Figure 3:
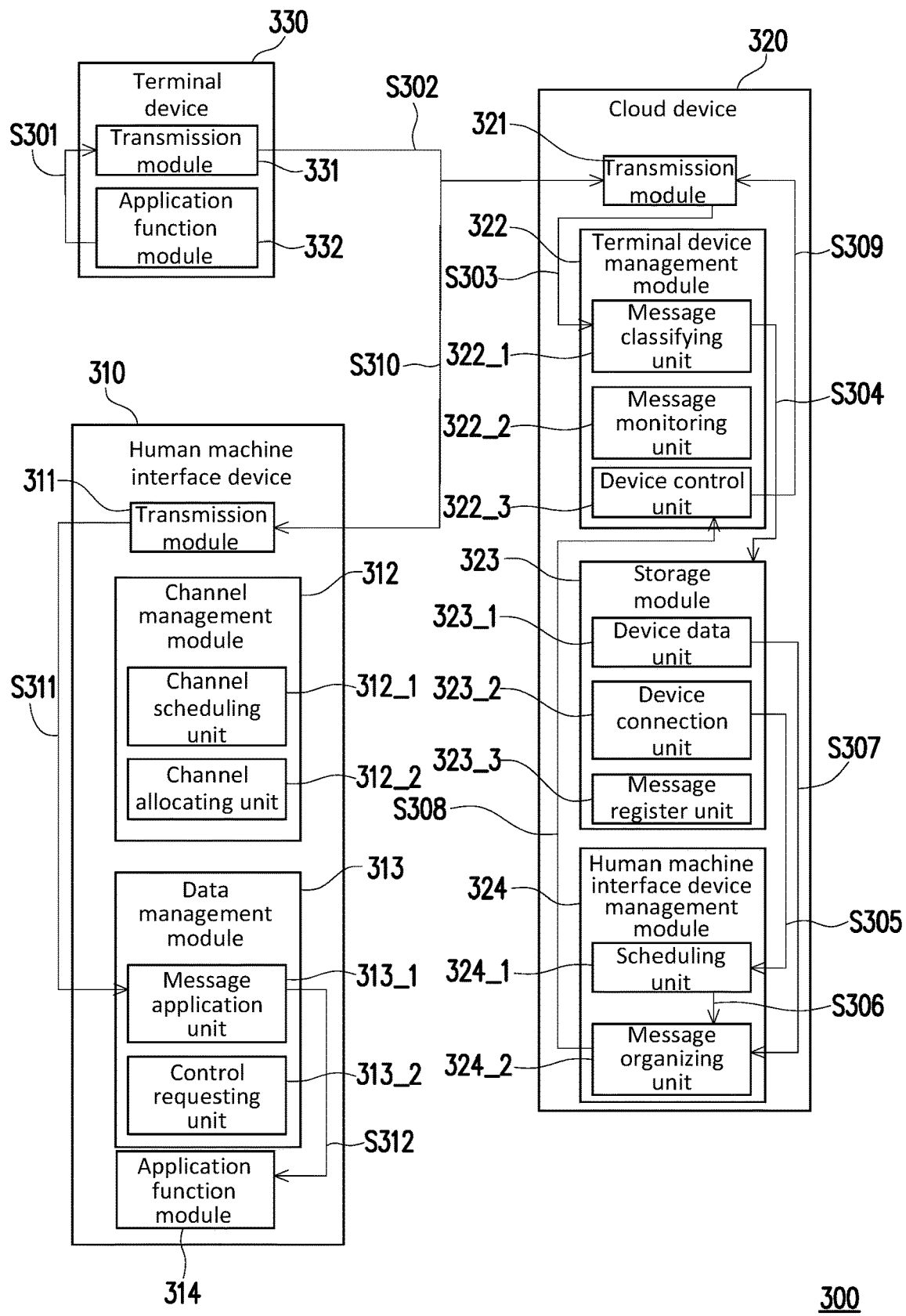
FIG. 3 is a schematic diagram of the operation of managing a terminal device according to an embodiment of the disclosure.

FIG. 3 is a schematic diagram of the operation of managing a terminal device according to an embodiment of the disclosure. An IoT system 300 includes a human machine interface device 310, a cloud device 320, and a terminal device 330. In this embodiment, a channel management module 312 of the human machine interface device 310 may include a channel scheduling unit 312_1 and a channel allocating unit 312_2. The channel scheduling unit 312_1 may calculate the subscription sequence according to the priority information of a plurality of control commands. The channel allocating unit 312_2 may allocate a plurality of first communication channels according to the subscription sequence, so as to transmit a plurality of control commands to subscribe to the first communication channels in sequence. In this embodiment, a data management module 313 of the human machine interface device 310 may include a message application unit 313_1 and a control requesting unit 313_2. The message application unit 313_1 may receive the organized message transmitted by the cloud device 320 via the first dedicated communication channel, and may classify the organized message. The cloud device 320 may organize a plurality of IoT messages of at least a portion of the terminal devices 330 to generate an organized message. In this embodiment, when all the first communication channels are occupied, the data management module 313 may transfer at least one control command with a higher priority to the control requesting unit 313_2 to transmit the corresponding request control command to the cloud device 320 via the first dedicated communication channel. In this embodiment, an application function module 314 of the human machine interface device 310 may generate a control command, and may receive the classified organized message provided by the message application unit 313_1.

In this embodiment, a terminal device management module 322 of the cloud device 320 may include a message classifying unit 322_1, a message monitoring unit 322_2, and a device control unit 322_3. The message classifying unit 322_1 may classify and store a plurality of device connection messages and a plurality of IoT messages received by a transmission module 321 into a device data unit 323_1 and a device connection unit 323_2 of the storage module 323. The message monitoring unit 322_2 may monitor the device data unit 323_1 to determine whether at least one of a plurality of terminal devices has not returned the IoT message. The device control unit 322_3 may explore the terminal devices to establish a connection with at least one corresponding terminal device.

In this embodiment, the storage module 323 of the cloud device 320 may include device the data unit 323_1, the device connection unit 323_2, and a message register unit 323_3. The device data unit 323_1 may store a control instruction and an IoT message of the human machine interface device 310 and the terminal devices 330, respectively. The device connection unit 323_2 may store a plurality of pieces of device connection information corresponding to the human machine interface device 310 and the terminal devices 330, respectively. The message register unit 323_3 may store a plurality of control commands to be transmitted to the terminal devices.

In this embodiment, a human machine interface device management module 324 of the cloud device 320 may include a scheduling unit 324_1 and a message organizing unit 324_2. The scheduling unit 324_1 may monitor the device connection information of the human machine interface device 310 stored in the device connection unit 323_2 to generate a message push schedule. The message organizing unit 324_2 may organize at least one IoT message of at least one terminal device 330 stored in the device data unit 323_1 to generate an organized message.

The description of the above-mentioned FIGS. 1 and 2 may be referred to for the function and implementation method of related modules and units executed by the human machine interface device 310, the cloud device 320, and the terminal device 330 of the IoT system 300 in this embodiment, so details thereof will not be repeated herein.

In this embodiment, the human machine interface device 310, the cloud device 320, and the terminal device 330 of the IoT system 300 may be operated by steps S301 to S312 to realize the function of managing the terminal device 330. It is worth noting that this embodiment is illustrated with the terminal device 330 as an example, and the implementation method of a communicative connection to a plurality of terminal devices may be analogized. In step S301, an application function module 332 of the terminal device 330 may output the corresponding IoT message to a transmission module 331 according to, for example, the sensing result of the sensor or the operation status of the terminal device 330. In step S302, the transmission module 331 may transmit the IoT message to the transmission module 321 of the cloud device 320. In step S303, the transmission module 321 may provide the IoT message to the message classifying unit 322_1.

In step S304, the message classifying unit 322_1 may classify the IoT message according to the status or data format, and store the IoT message to the device data unit 323_1 and the device connection unit 323_2 of the storage module 323. In step S305, the scheduling unit 324_1 may determine the connection status between the terminal device 330 and the human machine interface device 310 through the device connection unit 323_2. In step S306, the scheduling unit 324_1 may control the message organizing unit 324_2 according to the time schedule of the preset message push. In step S307, the message organizing unit 324_2 may read the aforementioned IoT message and other IoT messages corresponding to other terminal devices from the device data unit 323_1, and perform message organization to generate an organized message.

In step S308, the message organizing unit 324_2 may provide the organized message to the device control unit 322_3. In step S309, the device control unit 322_3 may provide the organized message to the transmission module 321 according to the message push schedule, and subscribe to the first dedicated communication channel for message transmission. In step S310, the transmission module 321 may transmit the organized message to the transmission module 311 of the human machine interface device 310 via the first dedicated communication channel. In step S311, the transmission module 311 may transmit the organized message to the message application unit 313_1. In step S312, the message application unit 313_1 may classify the organized message and transmit the organized message to the application function module 314, so that the user may realize the function of monitoring and managing the terminal device 330 by operating the application function module 314 of the human machine interface device 310.

In other words, when the cloud device 320 is connected to a plurality of terminal devices, the cloud device 320 may collect a plurality of the IoT messages of the terminal devices 330 through the above-mentioned steps S301 to S304, respectively. Moreover, after the messages are organized, the human machine interface device 310 only needs to subscribe to one first dedicated channel between the human machine interface device 310 and the cloud device 320 to obtain a large number of IoT messages of a large number of terminal devices at the same time. Therefore, the IoT system 300 of this embodiment may realize the function of monitoring or managing a large number of terminal devices at the same time.

Figure 4:
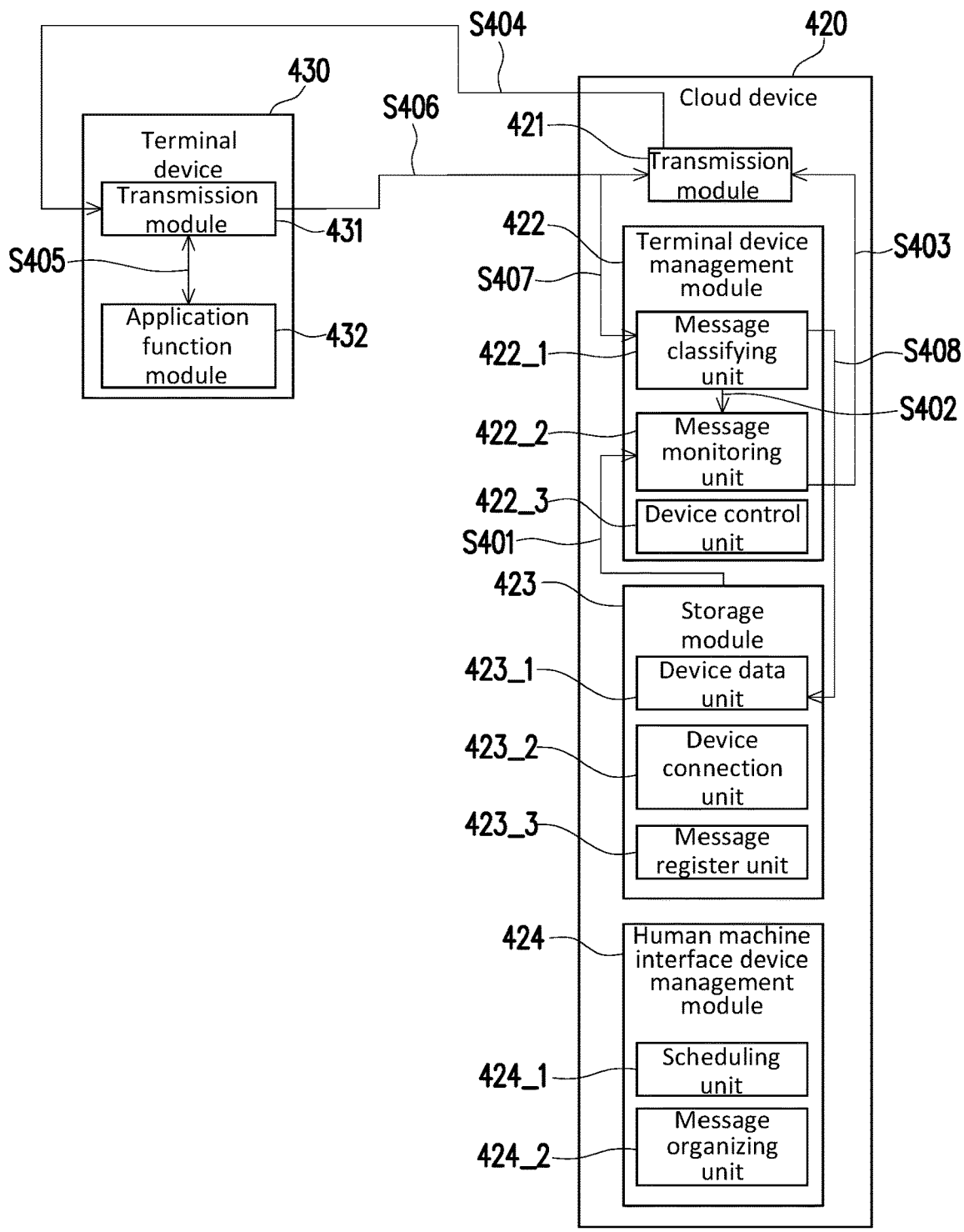
FIG. 4 is a schematic diagram of the operation of monitoring an IoT message according to an embodiment of the disclosure.

FIG. 4 is a schematic diagram of the operation of monitoring an IoT message according to an embodiment of the disclosure. Referring to FIG. 4, the description of the above-mentioned embodiments of FIGS. 1 to 3 may be referred to for the function and related technical features of related modules and units executed by a cloud device 420 and a terminal device 430 of an IoT system 400 of this embodiment, so details thereof will not be repeated herein. In this embodiment, the cloud device 420 and terminal device 430 of the IoT system 400 may execute the following steps S401 to S408 to realize the function of monitoring an IoT message. In step S401, a message monitoring unit 422_2 continuously checks the data of a device data unit 423_1 and a device connection unit 423_2 in a storage module 423. When the message monitoring unit 422_2 determines that the terminal device 430 has not returned an IoT message, in step S402, the message monitoring unit 422_2 operates a device control unit 422_3.

In step S403, the message monitoring unit 422_2 may transmit a status report command to a transmission module 421 through the device control unit 422_3. In step S404, the transmission module 421 may transmit the status report command to a transmission module 431 of the terminal device 430 via the second dedicated communication channel between the transmission module 421 and the terminal device 430. In step S405, an application function module 432 of the terminal device 430 may receive the status report command provided by the transmission module 431, and return the corresponding IoT message to the transmission module 431. In step S406, the terminal device 430 may return the IoT message to the transmission module 421 of the cloud device 420 through the transmission module 431 according to the status report command. In step S407, a message classifying unit 422_1 may classify the IoT message according to the status or data format. In step S408, the message classifying unit 422_1 may store the classified IoT message to the device data unit 423_1 of the storage module 423. Therefore, the IoT system 400 of this embodiment may ensure that the device data unit 423_1 in the storage module 423 of the cloud device 420 may stably update the latest status of each of the terminal devices, so as to effectively avoid data loss caused by an unstable connection status.

Figure 5:
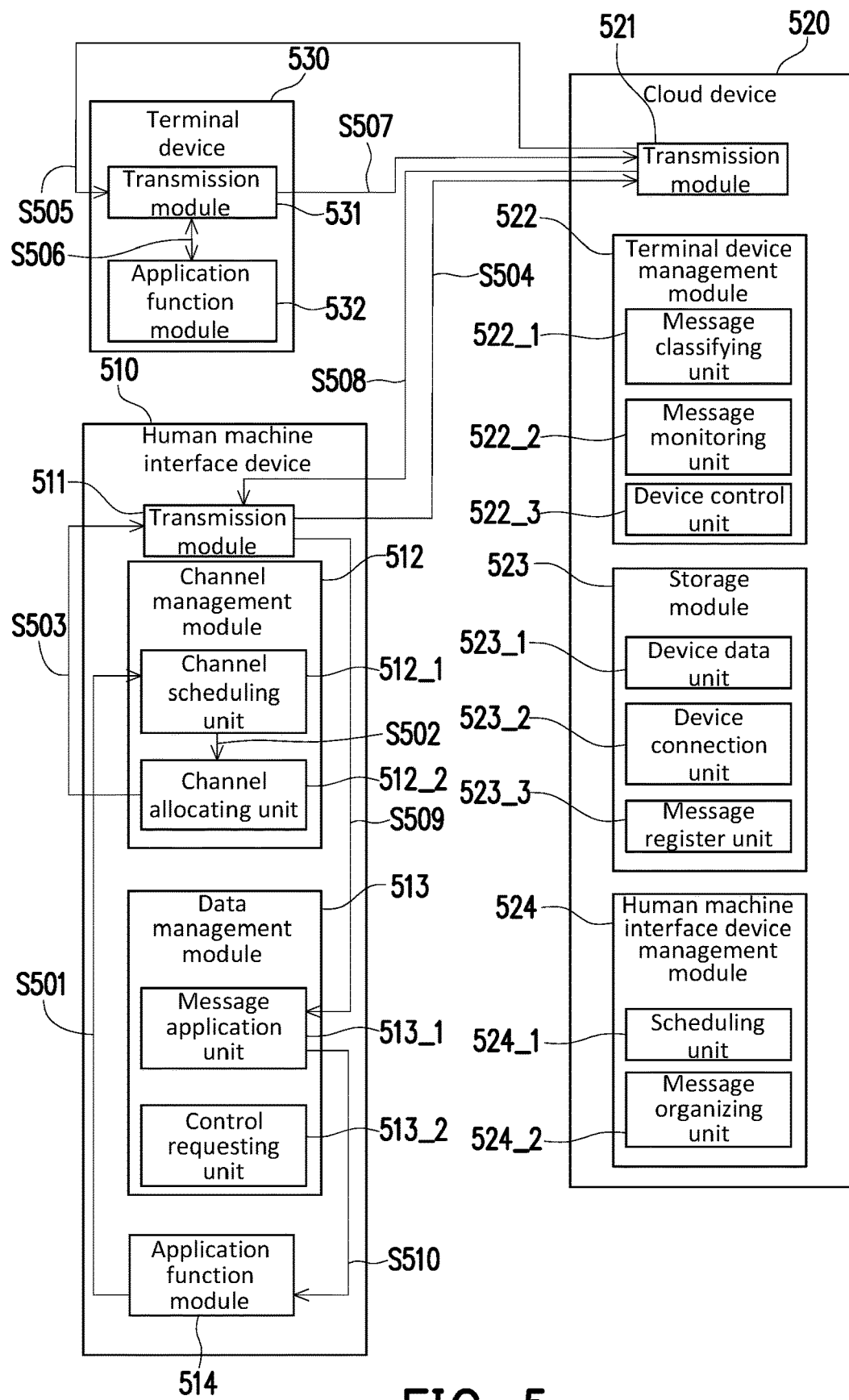
FIG. 5 is a schematic diagram of the operation of an IoT system being executed in a general mode according to an embodiment of the disclosure.

FIG. 5 is a schematic diagram of the operation of an IoT system being executed in a general mode according to an embodiment of the disclosure. Referring to FIG. 5, the description of the above-mentioned embodiments of FIGS. 1 to 4 may be referred to for the function and related technical features of related modules and units executed by a human machine interface device 510, a cloud device 520, and a terminal device 530 of an IoT system 500 of this embodiment, so details thereof will not be repeated herein. In this embodiment, the human machine interface device 510, the cloud device 520, and the terminal device 530 of the IoT system 500 may execute the following steps S501 to S510 to realize the function of controlling the terminal device 530 to be in the general mode. In step S501, the user may transmit a control command to a channel scheduling unit 512_1 of a channel management module 512 by operating an application function module 514 of the human machine interface device 510. In this embodiment, the channel scheduling unit 512_1 may include a command queue. The channel scheduling unit 512_1 may sort the control command into the command queue according to a subscription sequence. In this regard, the channel scheduling unit 512_1 may calculate a priority sequence and update the command queue according to information such as the level and priority of the control command. A channel allocating unit 512_2 subscribes to a free first communication channel in sequence according to the sequence of the control command in the command queue, and dynamically releases the first communication channel that has completed the transmission of the control command, so that the first communication channel may be subscribed to by the control command to be transmitted in the next sequence. In step S503, the channel allocating unit 512_2 transmits the control command to a transmission module 511, so that the transmission module 511 may transmit the control command to a transmission module 521 of the cloud device 520 via the subscribed first communication channel in step S504. In step S505, the transmission module 521 of the cloud device 520 may transmit the control command to a transmission module 531 of the terminal device 530 via the corresponding second communication channel. It is worth noting that the channel allocating unit 512_2 may calculate and set the dynamic release time of the subscribed first communication channel and the corresponding second communication channel to improve channel throughput.

In step S506, an application function module 532 of the terminal device 530 may receive the control command provided by the transmission module 531, and return the corresponding IoT message to the transmission module 531. In step S507, the terminal device 530 may return the IoT message to the transmission module 521 of the cloud device 520 through the transmission module 531. In step S508, the transmission module 521 may transmit the IoT message to the transmission module 511 of the human machine interface device 510 via the subscribed first communication channel. In step S509, the transmission module 511 may transmit the IoT message to a message application unit 513_1. In step S510, the message application unit 513_1 may classify the IoT message and transmit the IoT message to the application function module 514, so that the user may obtain the IoT message returned by the terminal device 530 by operating the application function module 514 of the human machine interface device 510. Therefore, the IoT system 500 of this embodiment may be operated in the general mode to efficiently control the terminal device 530 and realize the function of operating a large number of terminal devices at the same time.

In this embodiment, the channel allocating unit 512_2 may subscribe to the free first communication channel and the corresponding second communication channel in sequence according to the command queue, and dynamically release the first communication channel that has completed the transmission of the control command and the corresponding second communication channel for the control command to be transmitted in the next sequence to subscribe to. In other words, when the cloud device 520 is communicatively connected to a plurality of terminal devices, the user may control these terminal devices through the human machine interface device 510 without being limited by the number of channels, so as to realize an efficient terminal device control function. The IoT system 500 of this embodiment may effectively ensure that the human machine interface device 510 may perform efficient channel scheduling and allocation through the channel management module 512 under the limited number of first communication channels.

Figure 6:
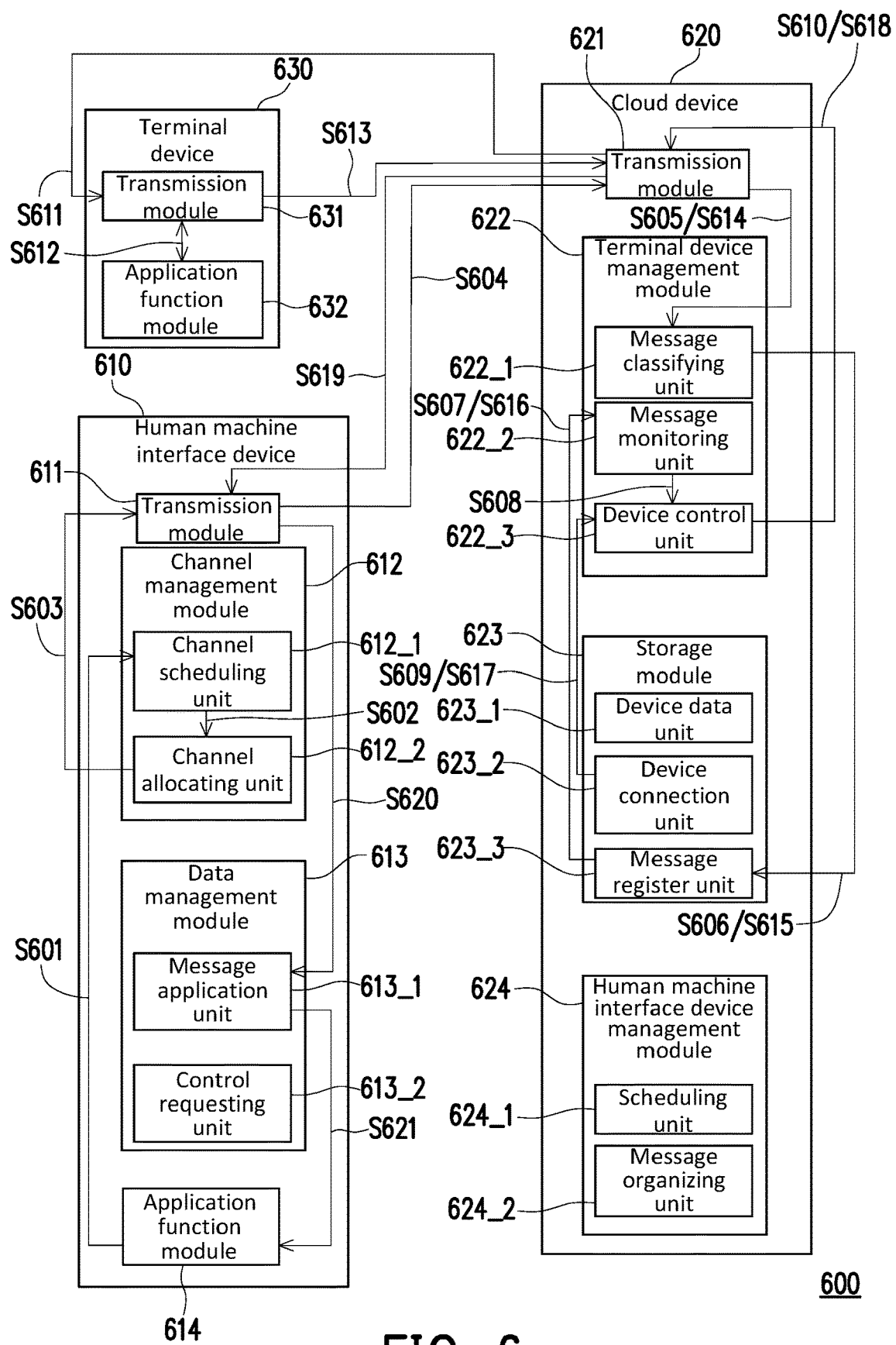
FIG. 6 is a schematic diagram of the operation of an IoT system being executed in a timeout mode according to an embodiment of the disclosure.

FIG. 6 is a schematic diagram of the operation of an IoT system being executed in a timeout mode according to an embodiment of the disclosure. Referring to FIG. 6, the description of the above-mentioned embodiments of FIGS. 1 to 3 may be referred to for the function and related technical features of related modules and units executed by a human machine interface device 610, a cloud device 620, and a terminal device 630 of an IoT system 600, so details thereof will not be repeated herein. In this embodiment, the human machine interface device 610, the cloud device 620, and the terminal device 630 of the IoT system 600 may execute the following steps S601 to S621 to realize the timeout mode function of the control terminal device 630. In step S601, the user may transmit a control command to a channel scheduling unit 612_1 of a channel management module 612 by operating an application function module 614 of the human machine interface device 610. In this embodiment, the channel scheduling unit 612_1 may include a command queue. The channel scheduling unit 612_1 may sort the control command into the command queue according to a subscription sequence. In this regard, the channel scheduling unit 612_1 may calculate a priority sequence and update the command queue according to information such as the level and priority of the control command. A channel allocating unit 612_2 dynamically subscribes to one of a limited number of first communication channels (including the corresponding second communication channel) according to the sequence of the control command in the command queue, and subscribes to one of the first communication channels corresponding to the terminal device 630. In step S603, the channel allocating unit 612_2 transmits the control command to a transmission module 611, so that the transmission module 611 may transmit the control command to a transmission module 621 of the cloud device 620 via the subscribed first communication channel in step S604. In step S605, a message classifying unit 622_1 of a terminal device management module 622 may receive the control command provided by the transmission module 621. In step S606, the message classifying unit 622_1 may classify the control command according to the status or data format and store the control command in a message register unit 623_3 of a storage module 623. In step S607, a message monitoring unit 622_2 may monitor whether the control command temporarily stored in the message register unit 623_3 has completed the transmission to the terminal device 630. In step S608, when the message monitoring unit 622_2 determines that the control command has timed out and has not completed the transmission to the corresponding terminal device 630, the message monitoring unit 622_2 may notify a device control unit 622_3. In step S609, the device control unit 622_3 may confirm the connection status of the terminal device 630 through a device connection unit 623_2. In step S610, when the connection status of the terminal device 630 is normal, the message monitoring unit 622_2 may retransmit the control command via a second dedicated communication channel connecting to the corresponding terminal device through the device control unit 622_3. In this regard, the device control unit 622_3 may generate a request control command according to the aforementioned untransmitted control command, and transmit the request control command to the transmission module 621.

In step S611, the transmission module 621 of the cloud device 620 may transmit the request control command to a transmission module 631 of the terminal device 630 via the corresponding second dedicated communication channel. In step S612, an application function module 632 of the terminal device 630 may receive the request control command provided by the transmission module 631, and return a corresponding IoT message to the transmission module 631. In step S613, the terminal device 630 may return the IoT message to the transmission module 621 of the cloud device 620 through the transmission module 631. In step S614, the message classifying unit 622_1 may receive and transmit the IoT message provided by the module 621. In step S615, the message classifying unit 622_1 may classify the IoT message according to the status or data format, and store the IoT message to the message register unit 623_3 of the storage module 623. In step S616, the message monitoring unit 622_2 may determine that the request control has been completed according to the IoT message temporarily stored in the message register unit 623_3. In step S617, the device control unit 622_3 may confirm the connection status of the human machine interface device 610 through the device connection unit 623_2. In step S618, the device control unit 622_3 may transmit the IoT message to the transmission module 621.

In step S619, the transmission module 621 may transmit the IoT message to the transmission module 611 of the human machine interface device 610 via a subscribed first dedicated communication channel. In step S620, the transmission module 631 may transmit the IoT message to a message application unit 613_1. In step S621, the message application unit 613_1 may classify the IoT message and transmit the IoT message to the application function module 614, so that the user may obtain the IoT message returned by the terminal device 630 by operating the application function module 614 of the human machine interface device 610. Therefore, the IoT system 600 of this embodiment may be operated in the timeout mode to perform the request control function on the terminal device 630. The IoT system 600 of this embodiment may effectively ensure that the control process between the human machine interface device 610 and the terminal device 630 does not cause control failure or data loss due to abnormal connections.

Figure 7:
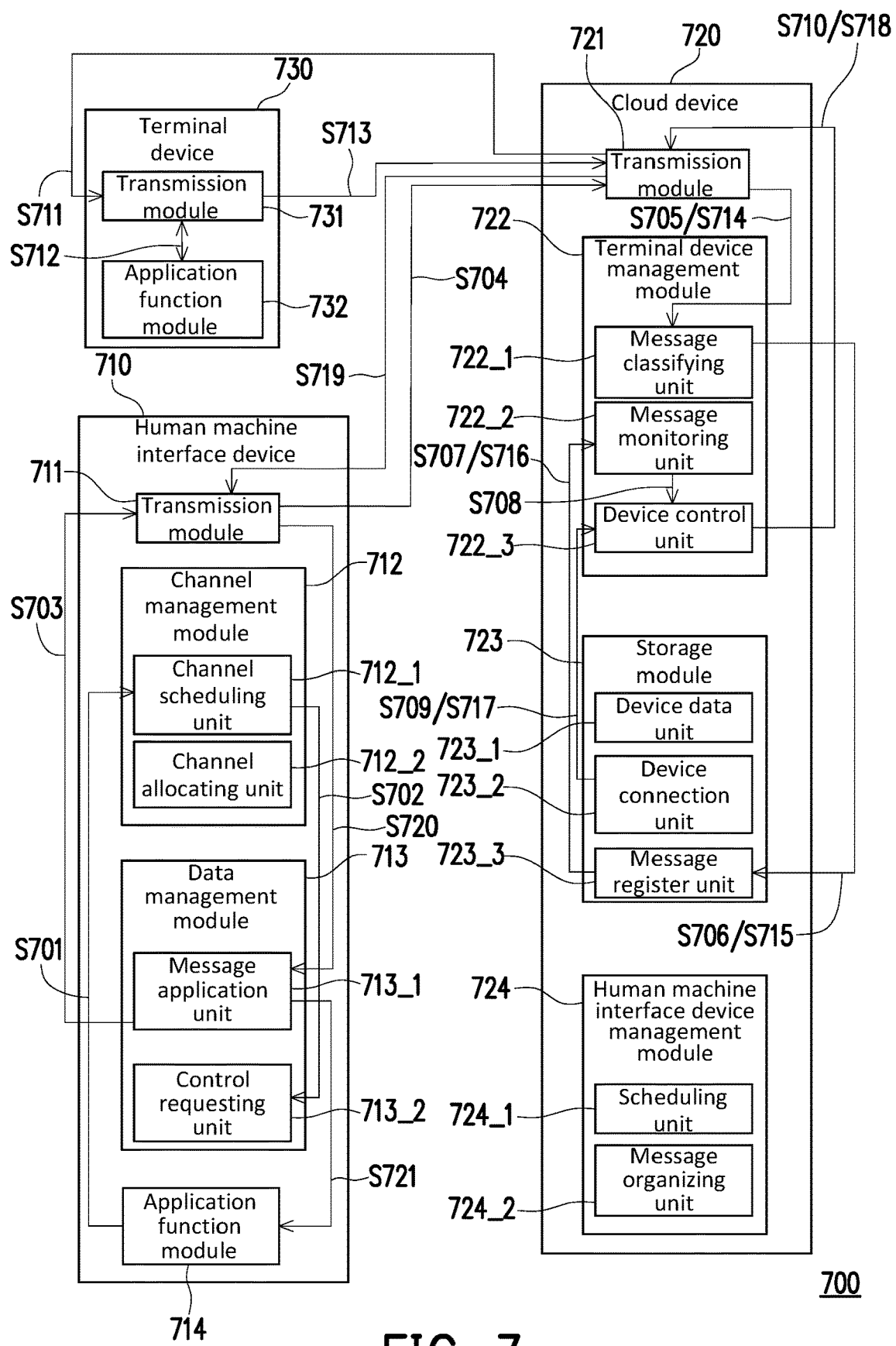
FIG. 7 is a schematic diagram of the operation of an IoT system being executed in a request mode according to an embodiment of the disclosure.

FIG. 7 is a schematic diagram of the operation of an IoT system being executed in a request mode according to an embodiment of the disclosure. Referring to FIG. 7, the description of the above-mentioned embodiments of FIGS. 1 to 3 may be referred to for the function and related technical features of related modules and units executed by a human machine interface device 710, a cloud device 720, and a terminal device 730 of an IoT system 700, so details thereof will not be repeated herein. In this embodiment, the human machine interface device 710, the cloud device 720, and the terminal device 730 of the IoT system 700 may execute the following steps S701 to S721 to realize the function of the request mode of the control terminal device 730. In step S701, the user may transmit a control command to a channel scheduling unit 712_1 of a channel management module 712 by operating an application function module 714 of the human machine interface device 710. In this embodiment, when the channel scheduling unit 712_1 detects that the command queue is congested and a higher-level (or higher-priority) control command is present, the channel scheduling unit 712_1 may transmit the control command with a higher level to a control requesting unit 713_2 of a data management module 713 to generate a corresponding request control command. In step S703, the control requesting unit 713_2 transmits the request control command to a transmission module 711. In step S704, the transmission module 711 may transmit the request control command to a transmission module 721 of the cloud device 720 via the first dedicated communication channel. In other words, when all the first communication channels are occupied, the channel scheduling unit 712_1 of this embodiment may transfer at least one control command (or emergency control command) with a higher priority to the control requesting unit 713_2 to transmit the corresponding request control command to the cloud device 720 via the first dedicated communication channel.

In step S705, a message classifying unit 722_1 of a terminal device management module 722 may receive the request control command provided by the transmission module 721. In step S706, the message classifying unit 722_1 may classify the request control command according to the status or data format, and store the request control command to a message register unit 723_3 of a storage module 723. In step S707, a message monitoring unit 722_2 may monitor whether the request control command temporarily stored in the message register unit 723_3 has completed the transmission to the terminal device 730. In step S708, the message monitoring unit 722_2 may notify a device control unit 722_3. In step S709, the device control unit 722_3 may confirm the connection status of the terminal device 730 through a device connection unit 723_2. In step S710, when the connection status of the terminal device 730 is normal, the device control unit 722_3 may transmit the request control command to the terminal device 730 via the second dedicated communication channel connecting to the terminal device 730.

In step S711, the transmission module 721 of the cloud device 720 may transmit the request control command to a transmission module 731 of the terminal device 730 via the corresponding second dedicated communication channel. In step S712, an application function module 732 of the terminal device 730 may receive the request control command provided by the transmission module 731, and return a corresponding IoT message to the transmission module 731. In step S713, the terminal device 730 may return the IoT message to the transmission module 721 of the cloud device 720 through the transmission module 731. In step S714, the message classifying unit 722_1 may receive the IoT message provided by the module 721. In step S715, the message classifying unit 722_1 may classify the IoT message according to the status or data format, and store the IoT message in the message register unit 723_3 of the storage module 723. In step S716, the message monitoring unit 722_2 may determine that the request control has been completed according to the IoT message temporarily stored in the message register unit 723_3. In step S717, the device control unit 722_3 may confirm the connection status of the human machine interface device 710 through the device connection unit 723_2. In step S718, the device control unit 722_3 may transmit the IoT message to the transmission module 721.

In step S719, the transmission module 721 may transmit the IoT message to the transmission module 711 of the human machine interface device 710 via the first dedicated communication channel. In step S720, the transmission module 731 may transmit the IoT message to a message application unit 713_1. In step S721, the message application unit 713_1 may classify the IoT message and transmit the IoT message to an application function module 714, so that the user may obtain the IoT message returned by the terminal device 730 by operating the application function module 714 of the human machine interface device 710. Therefore, the IoT system 700 of this embodiment may be operated in the request mode to perform the request control function on the terminal device 730, and may effectively prevent delay of transmitting the emergency control command to the corresponding terminal device due to congestion of the first communication channel.

Figure 8:
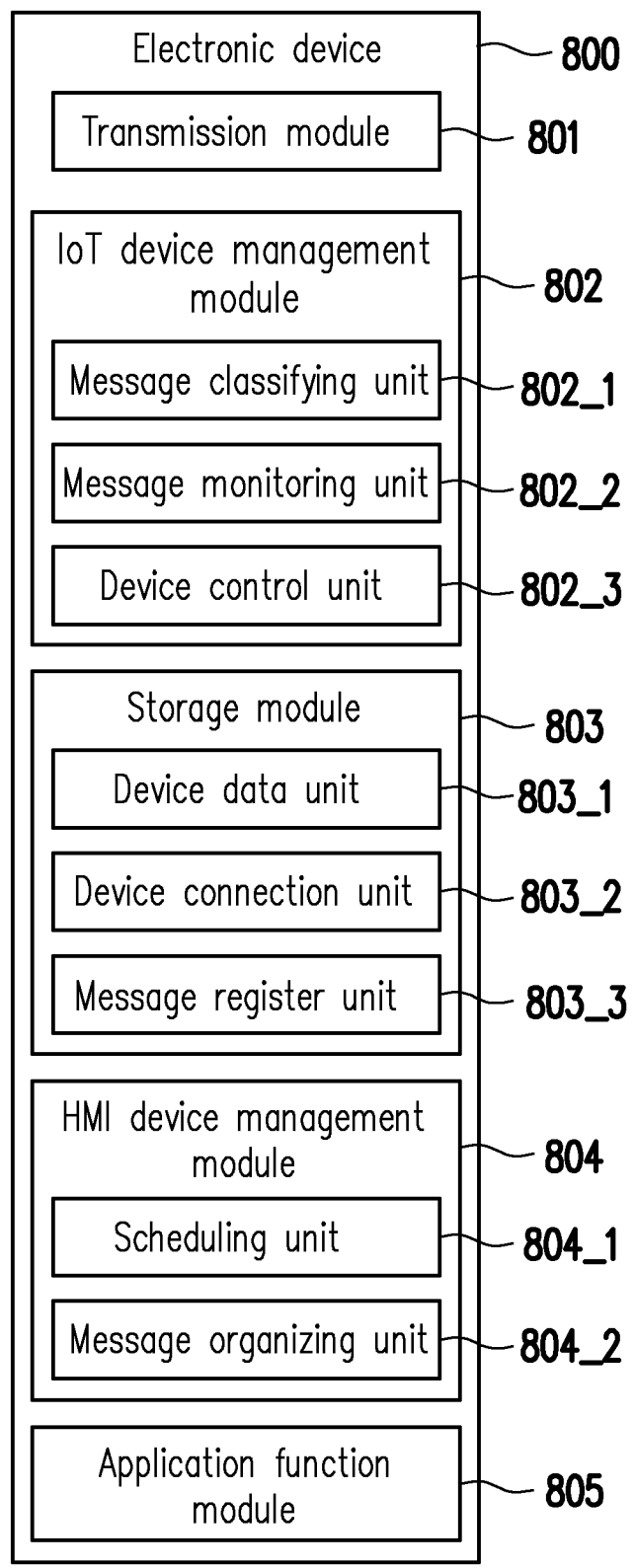
FIG. 8 is a schematic diagram of an electronic device according to an embodiment of the disclosure.

FIG. 8 is a schematic diagram of an electronic device according to an embodiment of the disclosure. Referring to FIG. 1, the cloud device 120 and the each of the terminal devices 130_1 to 130_N in FIG. 1 may be implement in the same way as the electronic device 800. In the embodiment of the disclosure, the electronic device 800 includes a transmission module 801, an IoT device management module 802, a storage module 803, a HMI device management module 804 and an application function module 805. The IoT device management module 802 includes a message classifying unit 802_1, a message monitoring unit 802_2 and a device control unit 802_3. The storage module 803 includes a device data unit 803_1, a device connection unit 803_2 and a message register unit 803_3. The HMI device management module 804 includes a scheduling 804_1 and a message organizing unit 804_2. The electronic device 800 may communicate with a HMI device through the transmission module 801.

In the embodiment of the disclosure, the electronic device 800 may include a processor and a memory, and the memory may store related programs and software, so that the processor may execute the related programs and software to implement the above units and modules in the electronic device 800. In the embodiment of the disclosure, the processor may be a central processing unit (CPU), a microcontroller (MCU) or other processing circuit, and the memory may be a non-transitory computer-readable recording medium, such as a read-only memory (ROM), an erasable programmable read-only memory (EPROM), an electrically-erasable programmable read-only memory (EEPROM) or a non-volatile memory (NVM).

In the embodiment of the disclosure, the transmission module 801 may transmit and receive messages based on wired/wireless communication protocols, and transmission module 801 may include device scan functions. The transmission module 801 may include at least one of 5G, Bluetooth, WiFi, Zibee, Matter, and Message Queuing Telemetry Transport (MQTT) modules. In the embodiment of the disclosure, the message classifying unit 802_1 may be used to classify the messages received from the transmission module 801 into categories such as connection status, device data, and control commands, and store them in the storage module 803, and may directly reply the command through the device control unit 802_3 according to a dedicated communication channel mode and whether the request must be responded immediately. The message monitoring unit 802_2 may monitor whether the command stored in the message register unit 803_3 has been completed, whether the device data unit 803_1 has timed out, and whether it has received the control assignment of the HMI device, etc., and needs to obtain the control right to trigger the device control unit 803_1 to perform control on its behalf. In the device management mode and general communication channel mode, the message monitoring unit 802_2 may also monitor whether the HMI device is not connected to access device data after a timeout. If timeout occurs, the message monitoring unit 802_2 may restore the connection with the original management device through a dedicated communication channel, and transmits a request to switch the transmission mode to the original mode and cancel the hosting. In the embodiment of the disclosure, the device control unit 802_3 may explore the exclusive channel of the IoT device (terminal device/HMI) and perform message push operation.

In the embodiment of the disclosure, the device data unit 803_1 may store terminal/HMI device environment information, such as sensor data, user permissions, etc. In the embodiment of the disclosure, the device connection unit 803_2 may store terminal/HMI device connection information, including fields such as device transmission mode (BT, WiFi, Matter, etc.), communication channel, additional information (IP, device name, etc.), and device hosting or HMI hosting. In the embodiment of the disclosure, the message register unit 803_3 may temporarily store the control commands of the HMI device.

In the embodiment of the disclosure, the scheduling unit 804_1 may monitor the connection status of the HMI device in the device connection unit 803_2 in the storage module 803, and may lead the push time control of the collected information. In the embodiment of the disclosure, the message organizing unit 804_2 may collect and convert the information in the device data unit 803_1, and can identify whether the terminal device and the HMI device are in a same communication area. If the terminal device and the HMI device are in a same communication area, the message organizing unit 804_2 may collect multiple information detected by the HMI that multiple terminal devices exist in the adjacent area or in the same area, and pass the result to the device control unit 802_3 in the IoT device management module 802. In the embodiment of the disclosure, the application function module 805 may provide application functions of electronic device 800, and may further include functions such as timing reports.

In addition, for the relevant technical features of the electronic device 800 in this embodiment, further reference may be made to the descriptions of the embodiments in FIG. 1 to FIG. 7, so details are not repeated here.

Figure 9:
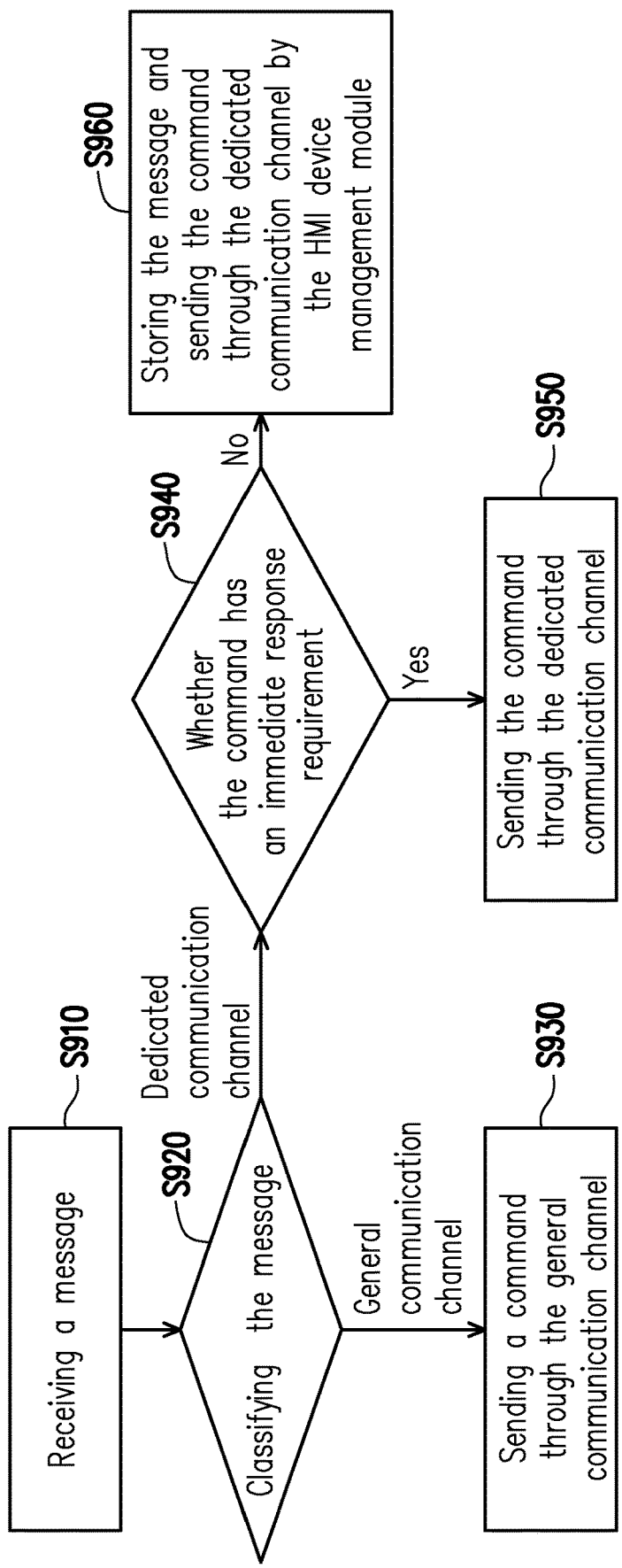
FIG. 9 is a flow chart of a message classification method according to an embodiment of the disclosure.

FIG. 9 is a flow chart of a message classification method according to an embodiment of the disclosure. Referring to FIG. 8 and FIG. 9, the message classifying unit 802_1 may perform the following steps S910 to S960. In step S910, the message classifying unit 802_1 may receive the massage from the transmission module 801, the massage may include a control command. In step S920, the message classifying unit 802_1 may classify the message, and determine the message to indicate the use of a general communication channel or a dedicated communication channel. If the message classifying unit 802_1 determine the message to indicate the use of the general communication channel, in step S930, the message classifying unit 802_1 may transmit the message to the device control unit 802_3, and transmit the corresponding command through the general communication channel. If the message classifying unit 802_1 determine the message to indicate the use of the dedicated communication channel, in step S940, the message classifying unit 802_1 may determine whether the command has an immediate response requirement. If the command has an immediate response requirement, in step S905, the message classifying unit 802_1 may transmit the message to the device control unit 802_3, and transmit the corresponding command through the dedicated communication channel. If no, in step S960, the message classifying unit 802_1 may store the message in to the storage module 803, and transmit the corresponding command through the dedicated communication channel by the HMI device management module 804.

Figure 10:
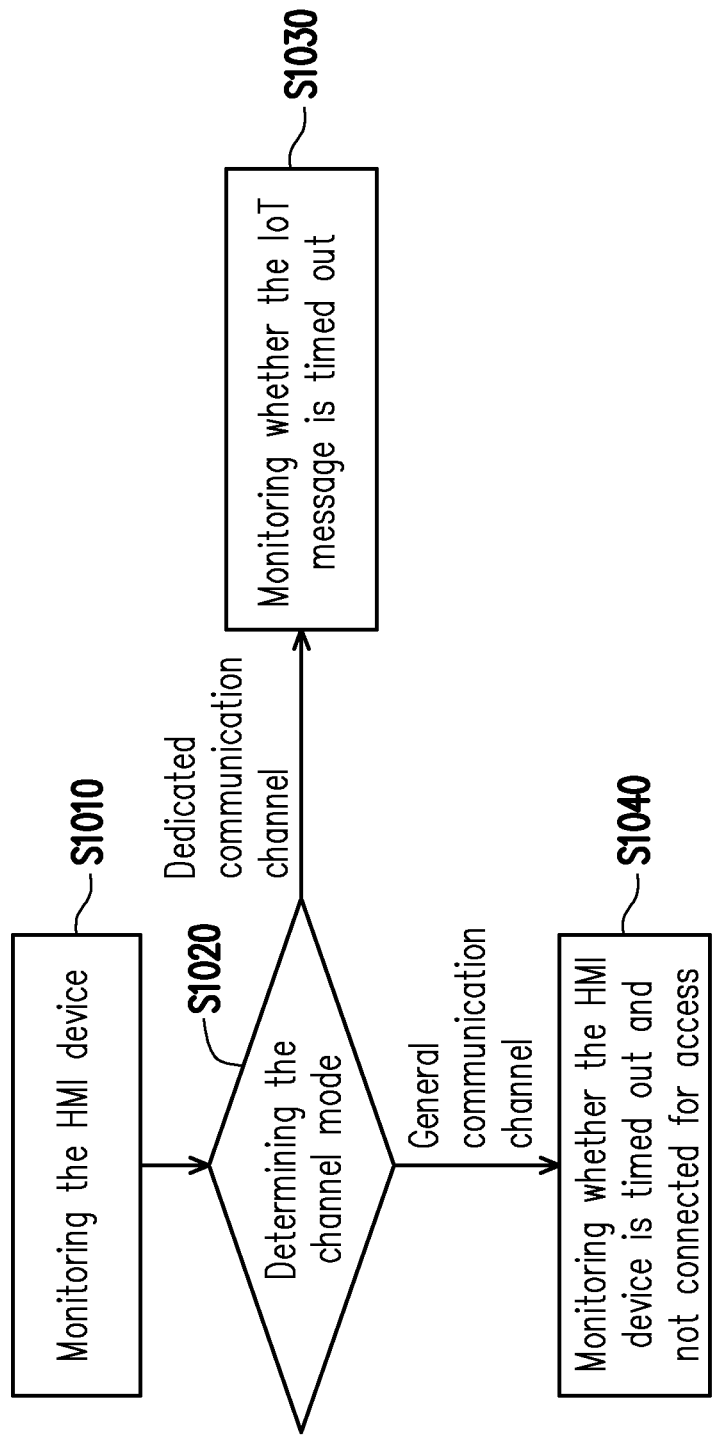
FIG. 10 is a flow chart of a message monitoring method according to an embodiment of the disclosure.

FIG. 10 is a flow chart of a message monitoring method according to an embodiment of the disclosure. Referring to FIG. 8 and FIG. 10, the message monitoring unit 802_2 may perform the following steps S1010 to S1040. In step S1010, the message monitoring unit 802_2 may monitor the HMI device by monitoring the message. In step S1020, the message monitoring unit 802_2 may determine the channel mode operated between the electronic device 800 and the HMI device. If the electronic device 800 communicates with the HMI device through a dedicated communication channel, in step S1030, the message monitoring unit 802_2 may monitor whether the IoT message is timed out. If the electronic device 800 communicates with the HMI device through a general communication channel, in step S1040, the message monitoring unit 802_2 may monitor whether the HMI device is timed out and not connected for access.

Figure 11:
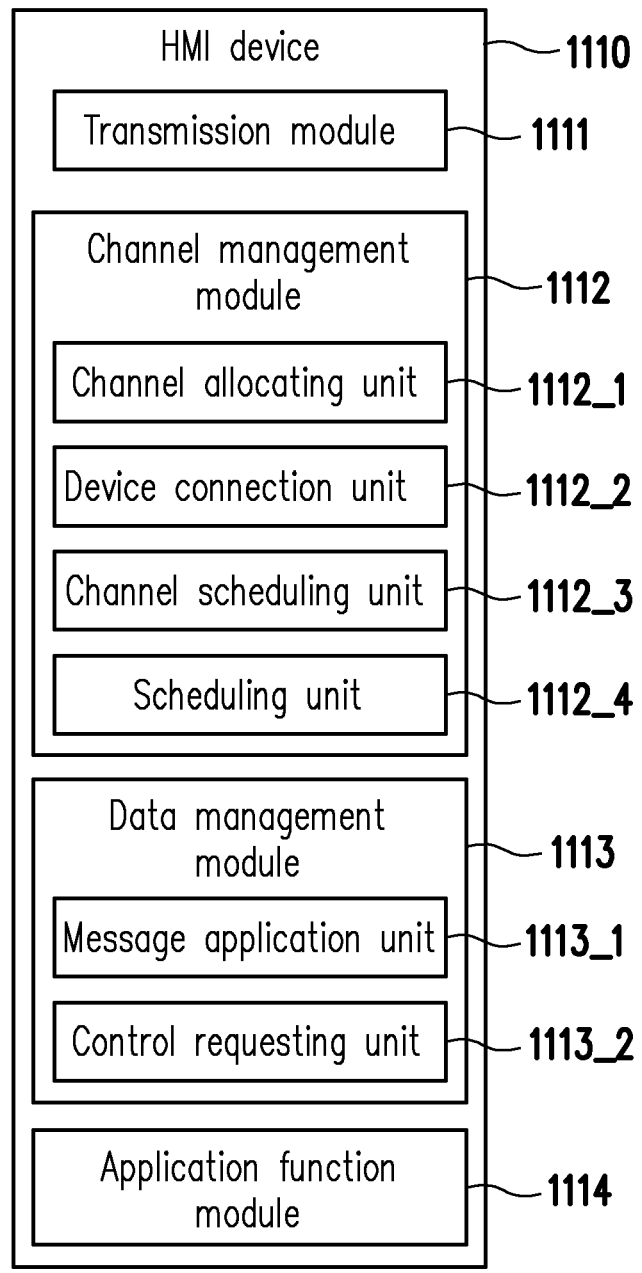
FIG. 11 is a schematic diagram of a human machine interface according to an embodiment of the disclosure.

FIG. 11 is a schematic diagram of a human machine interface according to an embodiment of the disclosure. Referring to FIG. 1, the HMI device 110 in FIG. 1 may be implement in the same way as the HMI device 1100. In the embodiment of the disclosure, the HMI device 1110 includes a transmission module 1111, a channel management module 1112, and a data management module 1113 and an application function module 1114. The channel management module 1112 includes a channel allocating unit 1112_1, a device connection unit 1112_2, a channel scheduling unit 1112_3 and a scheduling unit 1112_4. The data management module 1113 includes a message application unit 1113_1 and a control requesting unit 1113_2.

In the embodiment of the disclosure, the HMI device 1110 may include a processor and a memory, and the memory may store related programs and software, so that the processor may execute the related programs and software to implement the above units and modules in the HMI device 1110. In the embodiment of the disclosure, the processor may be a central processing unit (CPU), a microcontroller (MCU) or other processing circuit, and the memory may be a non-transitory computer-readable recording medium, such as a read-only memory (ROM), an erasable programmable read-only memory (EPROM), an electrically-erasable programmable read-only memory (EEPROM) or a non-volatile memory (NVM).

In the embodiment of the disclosure, the transmission module 1111 may establish multiple first communication channels and a first dedicated communication channel between the HMI device 1100 and the above electronic device 800 (i.e. the terminal device or the cloud device). The transmission module 1111 may transmit and receive messages based on wired/wireless communication protocols, and transmission module 1111 may include device scan functions.

In the embodiment of the disclosure, the channel management module 1112 may schedule and allocate the dedicated communication channels for subscribing terminal devices in a limited number of channels for control command transmission. In the embodiment of the disclosure, the channel allocating unit 1112_1 may dynamically subscribe to the occupied communication channel sequentially according to the queue priority calculated by the channel scheduling unit 1112_3, and design a dynamic release time to accelerate the communication channel allocation efficiency. When the channel allocation unit 1112_1 judges that the communication channel has no response or delayed response, the message monitoring unit of the IOT device management module in the cloud device is in charge, and the channel allocation unit 1112_1 may allocate the (common) communication channels, the dedicated communication channels and the transmission modes, and use a header of the message to describe the transmission mode and communication channel mode of the message. In the embodiment of the disclosure, the device connection unit 1112_2 may store the near-end connection information of the device, wherein the near-end connection information at least includes a device unique code, a managed sub-device, a communication channel information, a transmission mode information and time information of previous control. The near-end connection information is used to distinguish the transmission mode and communication channel of the HMI device, such as connecting the cloud device to transmit these commands to the terminal device, or connecting the terminal device to transmit these commands to the sub-terminal device.

In the embodiment of the disclosure, the channel scheduling unit 1112_3 may calculate the priority order of a command queue based on information such as the level and weight of the control command, and has a mechanism to take out higher-level commands in the command queue when all channels are busy, and transfer the control commands to the cloud device for control through the control requesting unit 1113_2 in the data management module 1113. In the embodiment of the disclosure, the scheduling unit 1112_4 may regularly determines the terminal devices that support transmission mode switching by reading the device connection unit 1112_2, and generates a low-priority detection command to the command queue in the channel scheduling unit 1112_3. Moreover, the scheduling unit 1112_4 may also regularly read the managed terminal device by reading the device connection unit 1112_2 that is in the general communication channel mode and has reached the time that should be controlled and managed, and generate a medium priority message to obtain the control command and transmit it to the command queue in the channel scheduling unit 1112_3.

In the embodiment of disclosure, the message application unit 1113_1 may receive the collected terminal device messages (collected information), and classify the messages according to the actual application and transmit them to the application function module. If the message application unit 1113_1 recognizes that the message is a change in transmission mode or communication channel mode, it will be assigned to the device connection unit 1112_2 and marked. If the message application unit 1113_1 recognizes that the message is a managed device message, it will transmit it to the original management device through the first dedicated communication channel, such as a cloud device. In the embodiment of disclosure, the control requesting unit 1113_2 may push the control command to the IOT device management module in the cloud device through the dedicated communication channel of the HMI device, so that the message monitoring unit of the cloud device may instead of the HMI to issue control commands after detection. In the embodiment of the disclosure, the application function module 1114 may have operation screens or functions that can actually interact with users, and include functions that can be set to connect devices through dedicated communication channel mode.

In addition, for the relevant technical features of the HMI device 1110 in this embodiment, further reference may be made to the descriptions of the embodiments in FIG. 1 to FIG. 7, so details are not repeated here.

Figure 12:
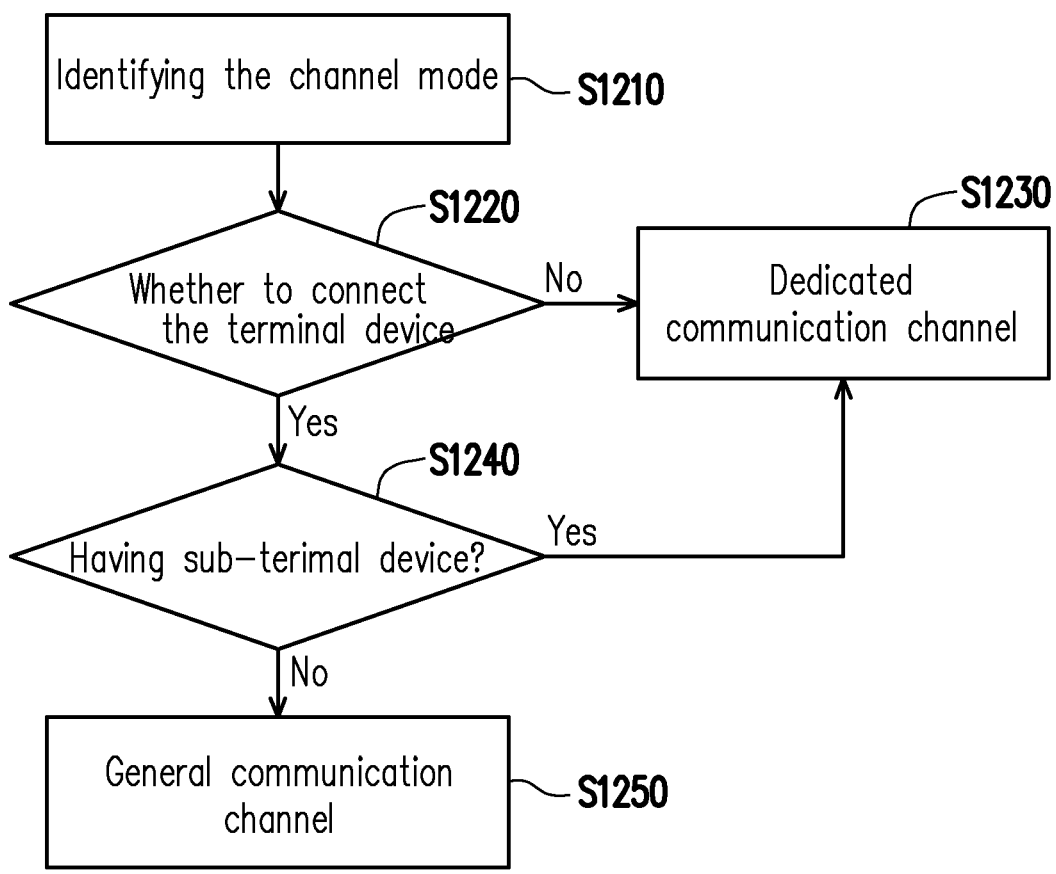
FIG. 12 is a flow chart of a channel allocating method according to an embodiment of the disclosure.

FIG. 12 is a flow chart of a channel allocating method according to an embodiment of the disclosure. Referring to FIG. 11 and FIG. 12, the message classifying unit 802_1 may perform the following steps S1210 to S1250. In step S1210, the channel allocation unit 1112_1 may identify the channel mode according to the header of the message. In step S1220, the channel allocation unit 1112_1 may determine whether to connect the terminal device. If the channel allocation unit 1112_1 does not connect the terminal device, in step S1230, the channel allocation unit 1112_1 may allocate the dedicated communication channel. If the channel allocation unit 1112_1 connects the terminal device, in step S1240, the channel allocation unit 1112_1 may further determine whether the terminal device has a sub-terminal device. If the terminal device has a sub-terminal device, in step S1230, the channel allocation unit 1112_1 may allocate the dedicated communication channel. If no, in step S1250, the channel allocation unit 1112_1 may allocate the general communication channel.

It is should be noted that, the IoT system of each of the following embodiments may not only implement as the IoT system of the above embodiments of FIG. 1 to FIG. 7, but also may further implement the functions of the following embodiments of FIG. 13 to FIG. 17, so as to switch the HMI device to manage and control the terminal device adjacent to the HMI device without going through the cloud device.

Figure 13:
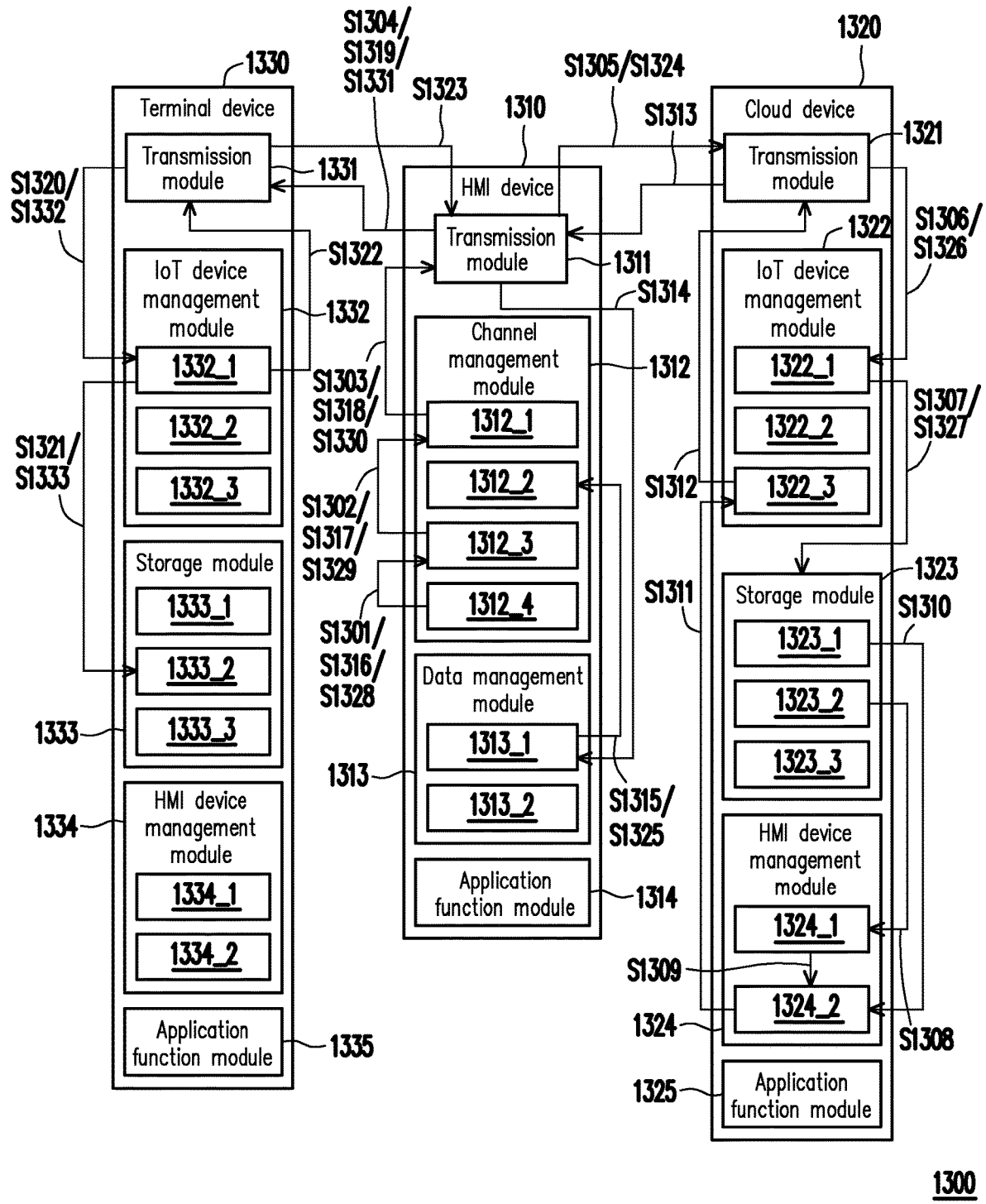
FIG. 13 is a schematic diagram of a HMI device actively switching transmission mode according to an embodiment of the disclosure.

FIG. 13 is a schematic diagram of a HMI device actively switching transmission mode according to an embodiment of the disclosure. Referring to FIG. 13, the IoT system 1300 includes a HMI device 1310, a cloud device 1320 and a terminal device 1330. The HMI device 1310 includes a transmission module 1311, a channel management module 1312, and a data management module 1313 and an application function module 1314. The channel management module 1312 includes a channel allocating unit 1312_1, a device connection unit 1312_2, a channel scheduling unit 1312_3 and a scheduling unit 1312_4. The data management module 1313 includes a message application unit 1313_1 and a control requesting unit 1313_2.

The cloud device 1320 includes a transmission module 1321, an IoT device management module 1322, a storage module 1323, a HMI device management module 1324 and an application function module 1325. The IoT device management module 1322 includes a message classifying unit 1322_1, a message monitoring unit 1322_2 and a device control unit 1322_3. The storage module 1323 includes a device data unit 1323_1, a device connection unit 1323_2 and a message register unit 1323_3. The HMI device management module 1324 includes a scheduling 1324_1 and a message organizing unit 1324_2. The cloud device 1320 may communicate with the transmission module 1311 of the HMI device 1310 through the transmission module 1321.

The terminal device 1330 includes a transmission module 1331, an IoT device management module 1332, a storage module 1333, a HMI device management module 1334 and an application function module 1335. The IoT device management module 1332 includes a message classifying unit 1332_1, a message monitoring unit 1332_2 and a device control unit 1332_3. The storage module 1333 includes a device data unit 1333_1, a device connection unit 1333_2 and a message register unit 1333_3. The HMI device management module 1334 includes a scheduling 1334_1 and a message organizing unit 1334_2. The cloud device 1330 may communicate with the transmission module 1311 of the HMI device 1310 through the transmission module 1331.

In the embodiment of the disclosure, the IoT system 1300 may perform the following steps S1301 to S1333 to implement the active switching of the transmission mode by the HMI device 1310. In step S1301, the scheduling unit 1312_4 may determine the terminal device 1330 that support transmission mode switching by reading the device connection unit 1312_2, and generates a low-priority detection command to a command queue in the channel scheduling unit 1312_3. The channel scheduling unit 1312_3 includes the command queue. In step S1302, the channel scheduling unit 1312_3 may calculate a subscription sequence according to priority information of a control command. In step S1303, the channel allocating unit 1312_1 may allocate the first communication channel according to the subscription sequence for the control command to be transmitted to subscribe to in sequence. In step S1304, the transmission module 1311 may determine whether the terminal device 1330 is adjacent to the HMI device 1310. In the embodiment of the disclosure, the terminal device 1330 determined to be adjacent to the HMI device 1310 is located in a same communication area as the HMI device 1310, or a distance between the HMI device 1310 and the terminal device 1330 determined to be adjacent to the HMI device 1310 is less than a pre-determined distance.

In step S1305, the transmission module 1311 may transmit a switch transmission mode request message corresponding to the terminal device 1330 adjacent to the HMI device 1310 to the cloud device 1320 via a first dedicated communication channel. In step S1306, the transmission module 1321 may transmit the switch transmission mode request message to the message classifying unit 1322_1. In step S1307, the message classifying unit 1322_1 may classify the switch transmission mode request message, and store the switch transmission mode request message into the device data unit 1323_1 and the device connection unit 1323_2 of the storage module 1323. In step S1308, the scheduling unit 1324_1 may determine the connection status between the terminal device 1330 and the HMI device 1310 through the device connection unit 1323_2. In step S1309, the scheduling unit 1324_1 may control the message organizing unit 1324_2 according to the time schedule of the preset message push. The scheduling unit 1324_1 may monitor a device connection information of the HMI device 1310 stored in the device connection unit 1323_2 to generate a message push schedule. In step S1310, the message organizing unit 1324_2 may read the aforementioned IoT message and other IoT messages corresponding to other terminal devices from the device data unit 1323_1, and perform message organization to generate an organized message.

The message organizing unit 1324_2 may organize the IoT message of the terminal device 1330 stored in the device data unit 1323_1 to generate an organized message. In step S1311, the message organizing unit 1324_2 may provide the organized message to the device control unit 1322_3. In step S1312, the device control unit 1322_3 may receive the organized message provided by the message organizing unit 1324_2, and transmit the organized message to the transmission module 1321 according to the message push schedule, and subscribe to the first dedicated communication channel for message transmission. In step S1313, the transmission module 1321 may transmit the organized message to the transmission module 1311 of the HMI device 1310 via the first dedicated communication channel. In step S1314, the transmission module 1311 may transmit the organized message to the message application unit 1313_1. The message application unit 1313_1 may classify the organized message and transmit the organized message to the application function module 1314, so that the user may realize the function of monitoring and managing the terminal device 1330 by operating the application function module 1314 of the HMI device 1310. In step S1315, the message application unit 1313_1 may switch the original management device permission of the classification mark to the device connection unit 1312_2.

In step S1316, the scheduling unit 1312_4 may further determines the terminal device 1330 that support transmission mode switching by reading the device connection unit 1312_2, and further generates a high-priority detection command to the command queue in the channel scheduling unit 1312_3. In step S1317, the channel scheduling unit 1312_3 may calculate the subscription sequence according to priority information of the control command. In step S1318, the channel allocating unit 1312_1 may allocate the first communication channel according to the subscription sequence for the control command to be transmitted to subscribe to in sequence. In step S1319, the transmission module 1311 may determine again whether the terminal device 1330 is adjacent to the HMI device 1310, and transmits the switch transmission mode request message to the transmission module 1331 of the terminal device 1330 adjacent to the HMI device 1310 via the first communication channel.

In step S1320, the transmission module 1331 may transmit the switch transmission mode request message to the message classifying unit 1332_1. The message classifying unit 1332_1 may receive the switch transmission mode request message, and determine the switch transmission mode request message must be responded immediately. In step S1321, the message classifying unit 1332_1 may store the switch transmission mode request message into the device connection unit 1333_2, and further determine whether the terminal device has a sub-terminal device. In the embodiment of the disclosure, when the terminal device 1330 has the sub-terminal device, the message classifying unit 1332_1 replies to the HMI device 1310 to perform a dedicated communication channel mode, and actives the HMI device management module 1334. In step S1322, when the terminal device 1330 has no the sub-terminal devices, the message classifying unit 1332_1 disables the HMI device management module 1334, replies completion of the switch transmission mode request from the first (general) communication channel through the device control unit 1332_3 to the HMI device 1310, and interrupts a second dedicated communication channel between the cloud device 1320 and the terminal device 1330.

In step S1323, the device control unit 1332_3 may reply a near-end connection information to the HMI device via the transmission module 1331. In step S1324, the HMI device 1310 may notify the cloud device 1320 and the message application unit 1313_1 that management switch has been completed via the transmission module 1311. In the embodiment of the disclosure, the near-end connection information may include a device unique code, a managed sub-terminal device, a communication channel information, a transmission mode information and time information of previous control.

In step S1325, the message application unit 1313_1 may update the information of the management switch has been completed recorded in the device connection unit 1312_2. In step S1326, the transmission module 1321 may transmit the near-end connection information to the message classifying unit 1322_1. In step S1327, the message classifying unit 1322_1 may classify the near-end connection information, and store the near-end connection information into the device data unit 1323_1 and the device connection unit 1323_2 of the storage module 1323.

In addition, if the HMI device 1310 finds that it is currently using the dedicated communication channel mode during the scheduling unit detection, in step S1328, the scheduling unit 1312_4 may determine that the transmission mode of the HMI device 1310 by reading the device connection unit 1312_2, and generates a dedicated communication channel establishment command with the highest priority to the command queue in the channel scheduling unit 1312_3. In step S1329, the channel allocating unit 1312_1 may allocate the first dedicated communication channel for the dedicated communication channel establishment command to be transmitted. In step S1330, the channel allocating unit 1312_1 may transmit the dedicated communication channel establishment command to the transmission module 1311. In step S1331, the transmission module 1311 may transmits the dedicated communication channel establishment command to the transmission module 1331. In step S1332, the transmission module 1331 may transmit the dedicated communication channel establishment command to the message classifying unit 1332_1. In step S1333, the message classifying unit 1332_1 may mark completed into the device connection unit 1333_2, and the device connection unit 1333_2 may establish the dedicated communication channel.

Therefore, the HMI device 1310 of the embodiment may switch to the regional transmission mode to manage and control the terminal device 1330 with lower delay and low power consumption. Furthermore, the terminal device 1330 may effectively reduce its power consumption after releasing the second dedicated communication channel.

Figure 14:
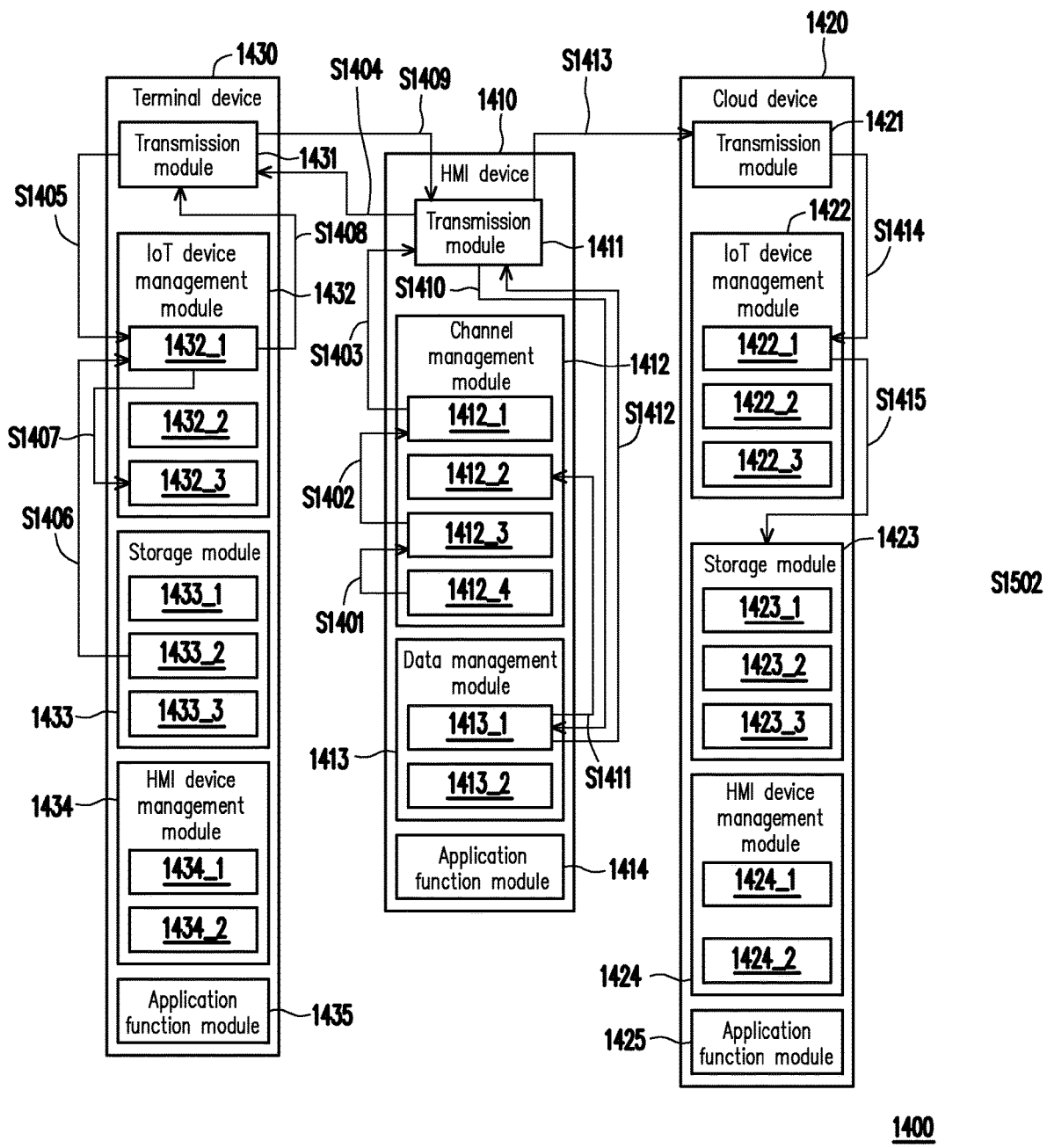
FIG. 14 is a schematic diagram of an operation of a general communication channel mode according to an embodiment of the disclosure.

FIG. 14 is a schematic diagram of an operation of a general communication channel mode according to an embodiment of the disclosure. Referring to FIG. 14, the IoT system 1400 includes a HMI device 1410, a cloud device 1420 and a terminal device 1430. The HMI device 1410 includes a transmission module 1411, a channel management module 1412, and a data management module 1413 and an application function module 1414. The channel management module 1412 includes a channel allocating unit 1412_1, a device connection unit 1412_2, a channel scheduling unit 1412_3 and a scheduling unit 1412_4. The data management module 1413 includes a message application unit 1413_1 and a control requesting unit 1413_2.

The cloud device 1420 includes a transmission module 1421, an IoT device management module 1422, a storage module 1423, a HMI device management module 1424 and an application function module 1425. The IoT device management module 1422 includes a message classifying unit 1422_1, a message monitoring unit 1422_2 and a device control unit 1422_3. The storage module 1423 includes a device data unit 1423_1, a device connection unit 1423_2 and a message register unit 1423_3. The HMI device management module 1424 includes a scheduling 1424_1 and a message organizing unit 1424_2. The cloud device 1420 may communicate with the transmission module 1411 of the HMI device 1410 through the transmission module 1421.

The terminal device 1430 includes a transmission module 1431, an IoT device management module 1432, a storage module 1433, a HMI device management module 1434 and an application function module 1435. The IoT device management module 1432 includes a message classifying unit 1432_1, a message monitoring unit 1432_2 and a device control unit 1432_3. The storage module 1433 includes a device data unit 1433_1, a device connection unit 1433_2 and a message register unit 1433_3. The HMI device management module 1434 includes a scheduling 1434_1 and a message organizing unit 1434_2. The cloud device 1430 may communicate with the transmission module 1411 of the HMI device 1410 through the transmission module 1431.

In the embodiment of the disclosure, the IoT system 1400 may perform the following steps S1401 to S1415 to perform the general communication channel mode. In step S1401, the scheduling unit 1412_4 of the channel management module 1412 in the HMI device 1410 may regularly read the information of the managed terminal device recorded in the device connection unit 1412 that is in the general communication channel mode, and it has reached the time that should be controlled and managed, and the scheduling unit 1412_4 may generate a message get command with a medium priority and transmit it to the command queue in the channel scheduling unit 1412_3. In step S1402, the channel scheduling unit 1412_3 may calculate a subscription sequence according to priority information of the message get command. In step S1403, the channel allocating unit 1412_1 may allocate the first communication channel according to the subscription sequence for the message get command to be transmitted to subscribe to in sequence. In step S1404, the transmission module 1411 may transmit the message get command to the transmission module 1431. In step S1405, the transmission module 1431 may transmit the message get command to the message classifying unit 1432_1. In step S1406, the message classifying unit 1432_1 may cooperate with the device connection unit 1433_2 to identify the message get command as a general communication channel request. In step S1407, the message classifying unit 1432_1 may transmit the message get command to the device control unit 1432_3. The device control unit 1432_3 may obtain a reply message from the device data unit 1433_1 or the application function module 1435. In step S1408, the device control unit 1432_3 may transmit the reply message to the transmission module 1431. In step S1409, the transmission module 1431 may transmit the reply message to the transmission module 1411 through the first communication channel.

In step S1410, the transmission module 1411 transmits the reply message to the message application unit 1413_1. In step S1411, the message application unit 1413_1 may recognize that the message currently in the mode of the first communication channel needs to update the latest control time point in the device connection unit 1412. In step S1412, the message application unit 1413_1 may distinguish whether there is an original management device (i.e. the cloud device 1420). If there is the original management device (i.e. the cloud device 1420), the message application unit 1413_1 may copy the reply message to the original management device (i.e. the cloud device 1420) through the first dedicated communication channel. In step S1413, the transmission module 1411 may transmit the reply message to the transmission module 1421 via the first dedicated communication channel. In step S1414, the transmission module 1421 may transmit the reply message to the message classifying unit 1422_1. In step S1415, the message classifying unit 1422_1 may classify the reply message, and store the reply message into the device data unit 1423_1 and the device connection unit 1423_2 of the storage module 1423.

Therefore, with a limited number of the general communication channels, the HMI device 1410 of this embodiment can be effectively scheduled and allocated through the channel management module 1412, so that the control of the terminal device 1430 will not be limited by the number of channels.

Figure 15:
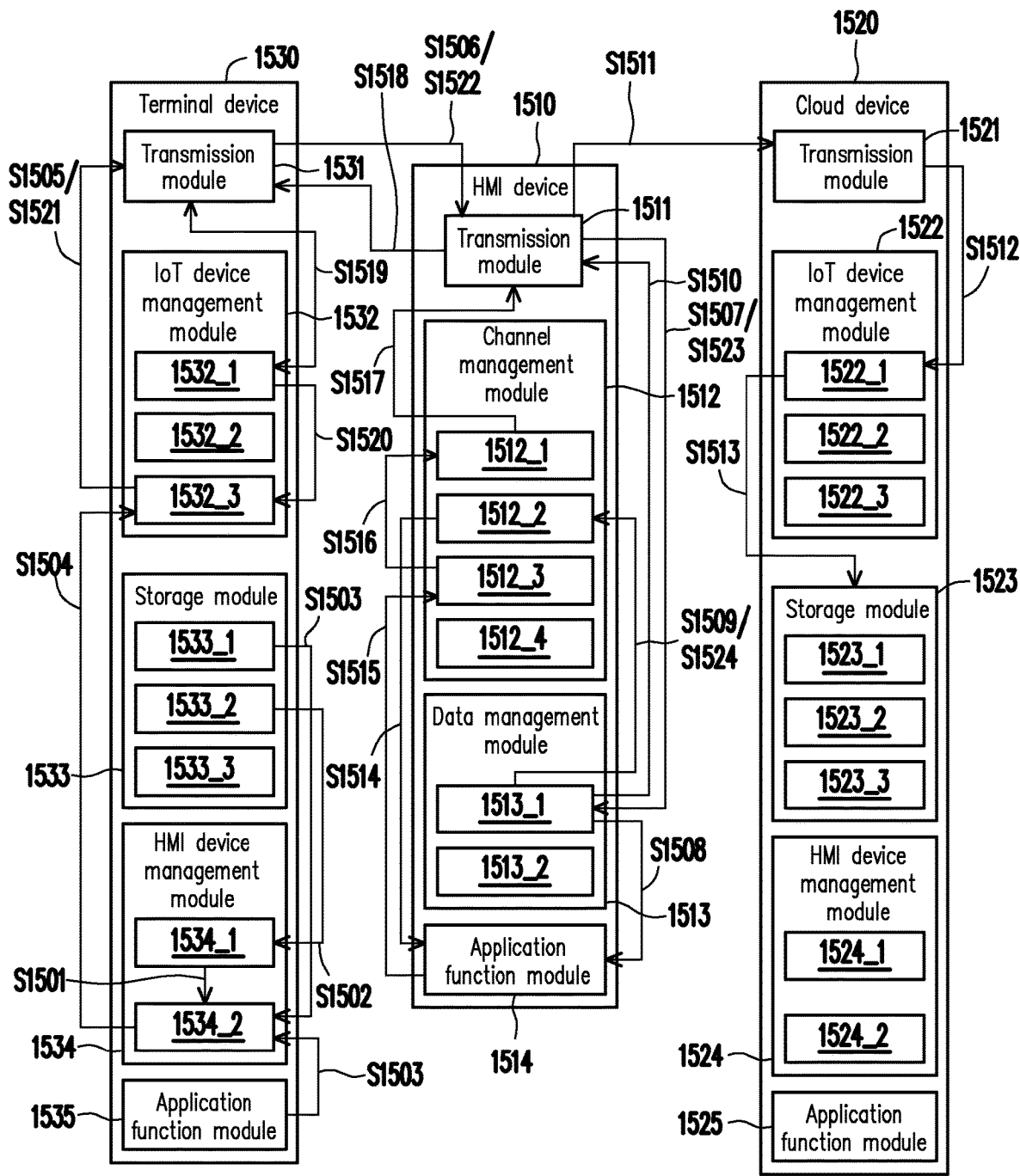
FIG. 15 is a schematic diagram of an operation of a dedicated communication channel mode according to an embodiment of the disclosure.

FIG. 15 is a schematic diagram of an operation of a dedicated communication channel mode according to an embodiment of the disclosure. Referring to FIG. 15, the IoT system 1500 includes a HMI device 1510, a cloud device 1520 and a terminal device 1530. The HMI device 1510 includes a transmission module 1511, a channel management module 1512, and a data management module 1513 and an application function module 1514. The channel management module 1512 includes a channel allocating unit 1512_1, a device connection unit 1512_2, a channel scheduling unit 1512_3 and a scheduling unit 1512_4. The data management module 1513 includes a message application unit 1513_1 and a control requesting unit 1513_2.

The cloud device 1520 includes a transmission module 1521, an IoT device management module 1522, a storage module 1523, a HMI device management module 1524 and an application function module 1525. The IoT device management module 1522 includes a message classifying unit 1522_1, a message monitoring unit 1522_2 and a device control unit 1522_3. The storage module 1523 includes a device data unit 1523_1, a device connection unit 1523_2 and a message register unit 1523_3. The HMI device management module 1524 includes a scheduling 1524_1 and a message organizing unit 1524_2. The cloud device 1520 may communicate with the transmission module 1511 of the HMI device 1510 through the transmission module 1521.

The terminal device 1530 includes a transmission module 1531, an IoT device management module 1532, a storage module 1533, a HMI device management module 1534 and an application function module 1535. The IoT device management module 1532 includes a message classifying unit 1532_1, a message monitoring unit 1532_2 and a device control unit 1532_3. The storage module 1533 includes a device data unit 1533_1, a device connection unit 1533_2 and a message register unit 1533_3. The HMI device management module 1534 includes a scheduling 1534_1 and a message organizing unit 1534_2. The cloud device 1530 may communicate with the transmission module 1511 of the HMI device 1510 through the transmission module 1531.

In the embodiment of the disclosure, the IoT system 1500 may perform the following steps S1501 to S1524 to perform the dedicated communication channel mode. In step S1501, the scheduling unit 1534_1 may control the message organizing unit 1534_2 according to the time schedule of the preset message push. In step S1502, the scheduling unit 1534_1 may determine the connection status between the terminal device 1530 and the HMI device 1510 through the device connection unit 1533_2. In step S1503, the message organizing unit 1534_2 may read the aforementioned IoT message and other IoT messages corresponding to other terminal devices from the device data unit 1533_1 and/or the application function module 1535, and perform message organization to generate an organized message. In step S1504, the message organizing unit 1534_2 may provide the organized message to the device control unit 1532_3. In step S1505, the device control unit 1532_3 may provide the organized message to the transmission module 1531 according to the message push schedule, and subscribe to the first dedicated communication channel for message transmission. In step S1506, the transmission module 1531 may transmit the organized message to the transmission module 1511 of the HMI device 1510 via the first dedicated communication channel. In step S1507, the transmission module 1511 may transmit the organized message to the message application unit 1513_1. In step S1508, the message application unit 1513_1 may classify the organized message and transmit the organized message to the application function module 1513, so that the user may realize the function of monitoring and managing the terminal device 1530 by operating the application function module 1514 of the HMI device 1510.

In step S1509, the message application unit 1513_1 may distinguish whether there is an original management device (i.e. the cloud device 1520). If there is the original management device (i.e. the cloud device 1520), the message application unit 1513_1 may copy the organized message to the original management device (i.e. the cloud device 1520) through the first dedicated communication channel. In step S1510, the message application unit 1513_1 may transmit the organized message to the transmission module 1511. In step S1511, the transmission module 1511 may transmit the reply message to the transmission module 1511 via the first dedicated communication channel. In step S1512, the transmission module 1521 may transmit the organized message to the message classifying unit 1522_1. In step S1513, the message classifying unit 1522_1 may classify the organized message, and store the organized message into the device data unit 1523_1 and the device connection unit 1523_2 of the storage module 1523.

In the embodiment of the disclosure, the application function module 1635 may have the functions of enabling and disabling the first dedicated communication channel mode. In step S1514, the application function module 1514 may read the relevant required information from the device connection unit 1512_2, including the unique code of the device, sub-device custody, communication channel and transmission mode, etc. In step S1515 the application function module 1514 may transmit the enable or disable command of the dedicated communication channel mode with the highest priority to the command queue of the channel scheduling unit 1512_3.

In step S1516, the channel scheduling unit 1512_3 may subscribe to (or release) the first dedicated communication channel. In step S1517, the channel allocating unit 1512_1 may allocate the first communication channel according to the subscription sequence for the enable or disable command of the dedicated communication channel mode to be transmitted to subscribe to in sequence. In step S1518, the transmission module 1511 may transmit the enable or disable command of the dedicated communication channel mode to the transmission module 1531. In the embodiment of the disclosure, the first dedicated communication channel will not be released dynamically, which can reduce the data transmission delay.

In step S1519, the transmission module 1531 may transmit the enable or disable command of the dedicated communication channel mode to the message classifying unit 1532_1. In step S1520, the message classifying unit 1532_1 may transmit the enable or disable command of the dedicated communication channel mode to the device control unit 1532_3. In step S1521, the device control unit 1532_3 may directly transmit the reply message to the transmission module 1531. In step S1522, the transmission module 1531 may transmit the reply message to the transmission module 1521 through the first dedicated communication channel.

In step S1523, the transmission module 1521 transmits the reply message to the message classifying unit 1522_1. In step S1524, the message classifying unit 1522_1 may mark the successful switch to the first dedicated communication channel mode. Therefore, the HMI device 1510 may control and manage complex devices with the lowest latency, and are suitable for situations that require real-time high priority or control sub-devices through the cloud device 1520 or terminal devices 1530.

Figure 16:
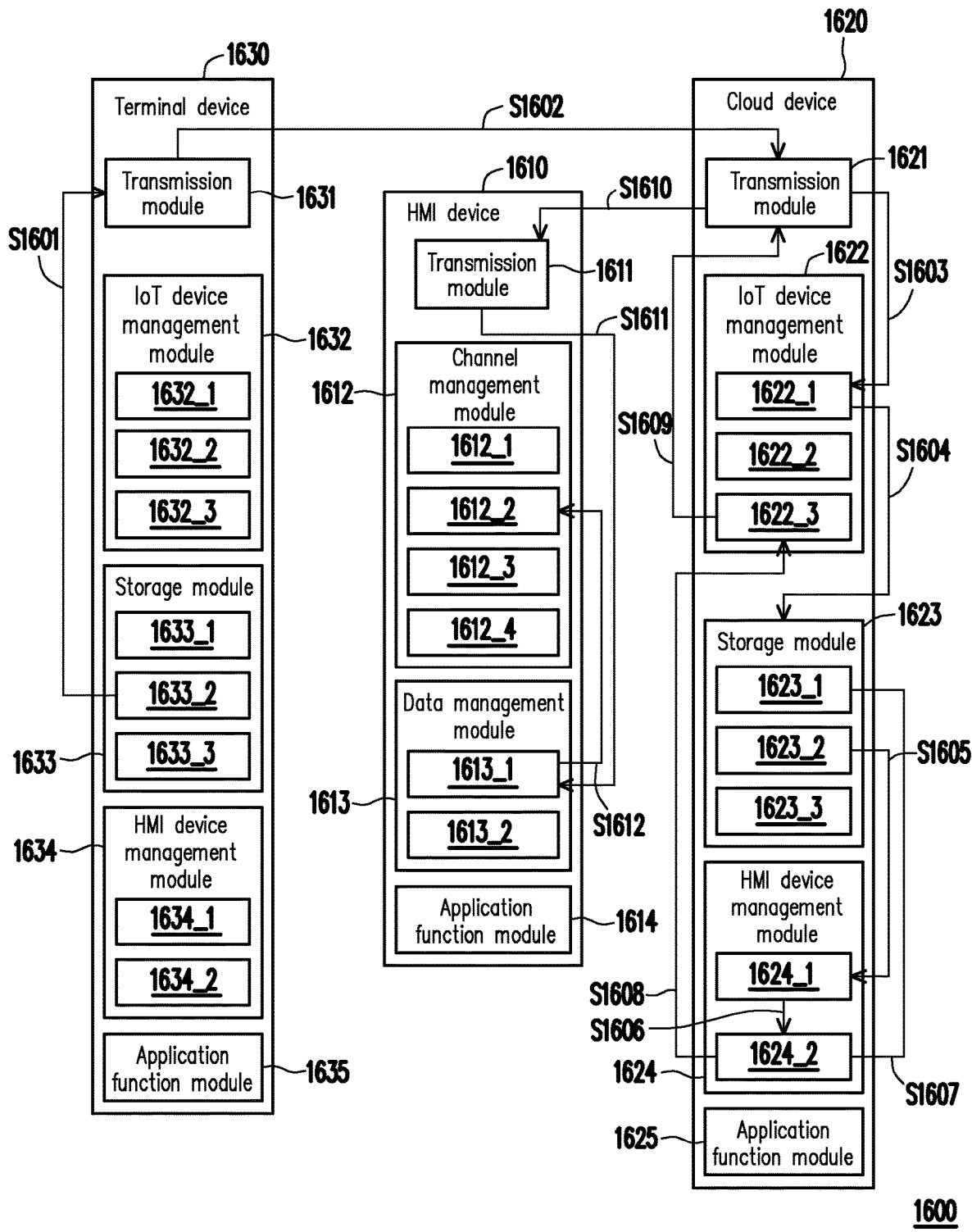
FIG. 16 is a schematic diagram of an operation of cloud device notifying to switch the transmission mode according to an embodiment of the disclosure.

FIG. 16 is a schematic diagram of an operation of cloud device notifying to switch the transmission mode according to an embodiment of the disclosure. Referring to FIG. 16, the IoT system 1600 includes a HMI device 1610, a cloud device 1620 and a terminal device 1630. The HMI device 1610 includes a transmission module 1611, a channel management module 1612, and a data management module 1613 and an application function module 1614. The channel management module 1612 includes a channel allocating unit 1612_1, a device connection unit 1612_2, a channel scheduling unit 1612_3 and a scheduling unit 1612_4. The data management module 1613 includes a message application unit 1613_1 and a control requesting unit 1613_2.

The cloud device 1620 includes a transmission module 1621, an IoT device management module 1622, a storage module 1623, a HMI device management module 1624 and an application function module 1625. The IoT device management module 1622 includes a message classifying unit 1622_1, a message monitoring unit 1622_2 and a device control unit 1622_3. The storage module 1623 includes a device data unit 1623_1, a device connection unit 1623_2 and a message register unit 1623_3. The HMI device management module 1624 includes a scheduling 1624_1 and a message organizing unit 1624_2. The cloud device 1620 may communicate with the transmission module 1611 of the HMI device 1610 through the transmission module 1621.

The terminal device 1630 includes a transmission module 1631, an IoT device management module 1632, a storage module 1633, a HMI device management module 1634 and an application function module 1635. The IoT device management module 1632 includes a message classifying unit 1632_1, a message monitoring unit 1632_2 and a device control unit 1632_3. The storage module 1633 includes a device data unit 1633_1, a device connection unit 1633_2 and a message register unit 1633_3. The HMI device management module 1634 includes a scheduling 1634_1 and a message organizing unit 1634_2. The cloud device 1630 may communicate with the transmission module 1611 of the HMI device 1610 through the transmission module 1631.

In the embodiment of the disclosure, the IoT system 1600 may perform the above steps S1301 to S1333 of the embodiment of FIG. 13 to implement the active switching of the transmission mode by the HMI device 1610, and the IoT system 1600 may continuously perform the following steps S1601 to S1612 to further perform the operation of cloud device notifying to switch the transmission mode. In step S1601, the device connection unit 1633_3 and the application function module 1635 may transmit a message of an upload information to the transmission module 1631, and the information may include the control command provided by the application function module 1635 and the connection message provided by the device connection unit 1633_3. The message of the upload information may include the information of the transmission mode (e.g. Bluetooth, WiFi, and Matter), additional information (ip, device name) and other relevant information that can be used as area identification. In step S1602, the transmission module 1631 may transmit the message of the upload information to the transmission module 1621. In step S1603, the transmission module 1621 may transmit the message of the upload information to the message classifying unit 1622_1. In step S1604, the message classifying unit 1622_1 may classify the message of the upload information, and store the message of the upload information into the device data unit 1623_1 and the device connection unit 1623_2 of the storage module 1623.

In step S1605, the scheduling unit 1624_1 may determine the connection status between the terminal device 1630 and the HMI device 1610 through the device connection unit 1623_2. In step S1606, the scheduling unit 1324_1 may control the message organizing unit 1624_2 according to the time schedule of the preset message push. The scheduling unit 1624_1 may monitor a device connection information of the HMI device 1610 stored in the device connection unit 1623_2 to generate a message push schedule. In step S1607, the message organizing unit 1624_2 may read the aforementioned IoT message and other IoT messages corresponding to other terminal devices from the device data unit 1623_1, and perform message organization to generate an organized message. Moreover, the message organizing unit 1624_2 may further identify whether the terminal device 1620 and the HMI device 1610 are located in a same communication area. The message organizing unit 1624_2 may detect whether the terminal device 1630 exists in the area adjacent to or in the same area as the HMI device 1610. If the terminal device 1630 exists in the area adjacent to or in the same area as the HMI device 1610, the message organizing unit 1624_2 will collect multiple information detected by the HMI device 1610 that multiple terminal devices exist in the adjacent area or in the same area, and organize into the organized message. In step S1608, the message organizing unit 1624_2 may provide the organized message to the device control unit 1622_3. In step S1609, the device control unit 1622_3 may receive the organized message provided by the message organizing unit 1624_2, and transmit the organized message to the transmission module 1621 according to the message push schedule, and subscribe to the first dedicated communication channel for message transmission. In step S1610, the transmission module 1621 may transmit the organized message to the transmission module 1611 of the HMI device 1610 via the first dedicated communication channel. In step S1611, the transmission module 1611 may transmit the organized message to the message application unit 1613_1. The message application unit 1613_1 may classify the organized message and transmit the organized message to the application function module 1614, so that the user may realize the function of monitoring and managing the terminal device 1330 by operating the application function module 1314 of the HMI device 1310. In step S1612, the message application unit 1613_1 may switch the original management device permission of the classification mark to the device connection unit 1612_2. And then, the IoT system 1600 may perform the above steps S1301 to S1333 of the embodiment of FIG. 13 again.

Therefore, the HMI device 1610 of the embodiment may switch to the regional transmission mode to manage and control the terminal device 1630 with lower delay and low power consumption. Furthermore, the terminal device 1630 may effectively reduce its power consumption after releasing the second dedicated communication channel.

Figure 17:
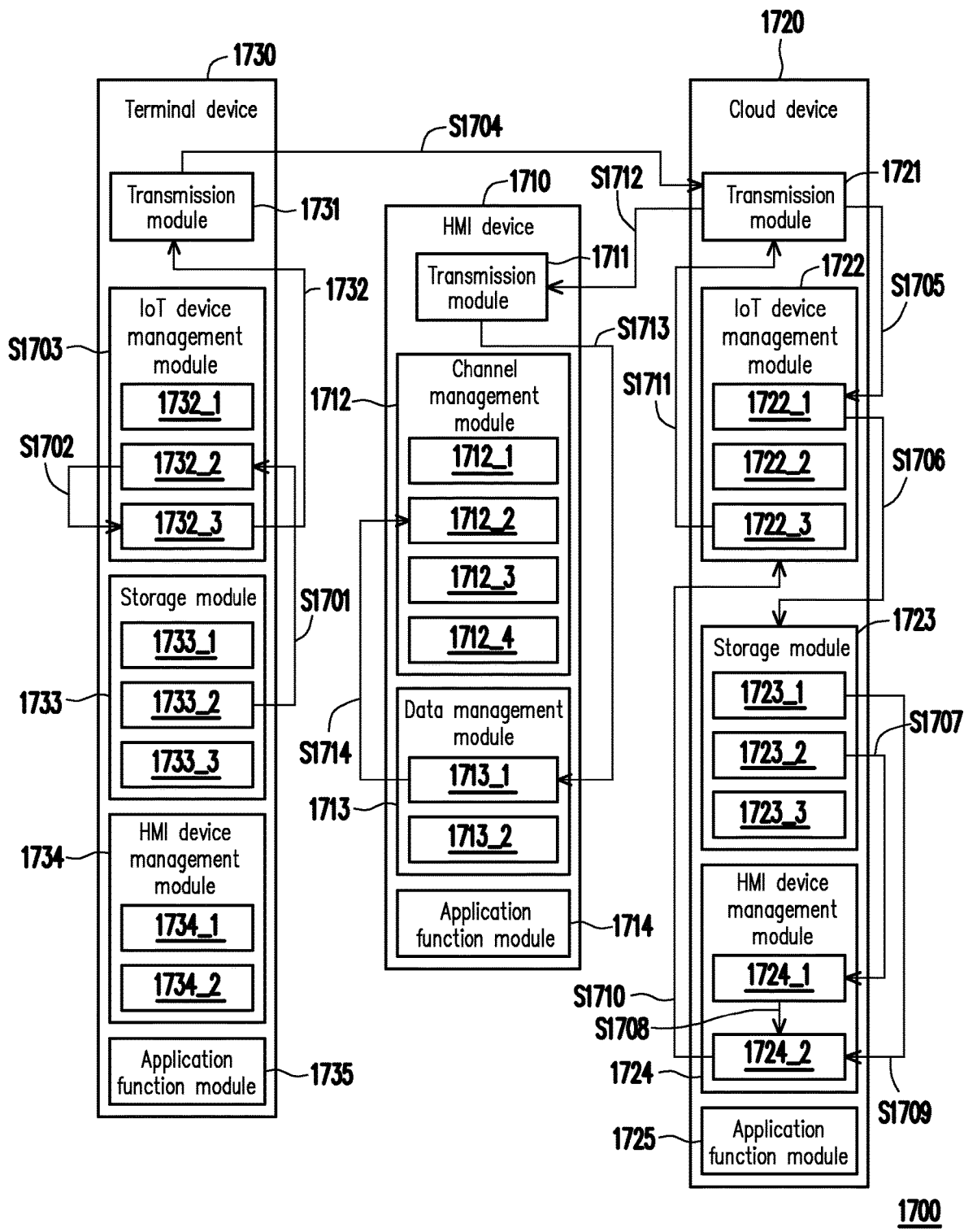
FIG. 17 is a schematic diagram of an operation of the terminal device notifying to switch the transmission mode according to an embodiment of the disclosure.

FIG. 17 is a schematic diagram of an operation of the terminal device notifying to switch the transmission mode according to an embodiment of the disclosure. Referring to FIG. 17, the IoT system 1700 includes a HMI device 1710, a cloud device 1720 and a terminal device 1730. The HMI device 1710 includes a transmission module 1711, a channel management module 1712, and a data management module 1713 and an application function module 1714. The channel management module 1712 includes a channel allocating unit 1712_1, a device connection unit 1712_2, a channel scheduling unit 1712_3 and a scheduling unit 1712_4. The data management module 1713 includes a message application unit 1713_1 and a control requesting unit 1713_2.

The cloud device 1720 includes a transmission module 1721, an IoT device management module 1722, a storage module 1723, a HMI device management module 1724 and an application function module 1725. The IoT device management module 1722 includes a message classifying unit 1722_1, a message monitoring unit 1722_2 and a device control unit 122_3. The storage module 1723 includes a device data unit 1723_1, a device connection unit 1723_2 and a message register unit 1723_3. The HMI device management module 1724 includes a scheduling 1724_1 and a message organizing unit 1724_2. The cloud device 1720 may communicate with the transmission module 1711 of the HMI device 1710 through the transmission module 1721.

The terminal device 1730 includes a transmission module 1731, an IoT device management module 1732, a storage module 1733, a HMI device management module 1734 and an application function module 1735. The IoT device management module 1732 includes a message classifying unit 1732_1, a message monitoring unit 1732_2 and a device control unit 1732_3. The storage module 1733 includes a device data unit 1733_1, a device connection unit 1733_2 and a message register unit 1733_3. The HMI device management module 1734 includes a scheduling 1734_1 and a message organizing unit 1734_2. The cloud device 1730 may communicate with the transmission module 1711 of the HMI device 1710 through the transmission module 1731.

In the embodiment of the disclosure, the IoT system 1700 may perform the following steps S1701 to S1714 to further perform the operation of the terminal device notifying to switch the transmission mode. In step S1701, when the terminal device 1730 is in a managed mode (i.e. the terminal device 1730 is managed by the HMI device 1710) and the transmission mode is the general communication channel mode, the message monitoring unit 1732_2 may monitor whether the HMI device 1710 is not connected to access device data within timeout. If the HMI device 1710 is not connected to access device data within timeout, in step S1702, the message monitoring unit 1732_2 may request the device control unit 1732_3 transmits a switch transmission mode request message to switch the transmission mode to the original mode and cancel the hosting. In step S1703, the device control unit 1732_3 transmits the switch transmission mode request message to the transmission module 1731. In step S1704, the transmission module 1731 transmits the switch transmission mode request message to the transmission module 1721. In step S1705, the transmission module 1721 transmits switch transmission mode request message to the message classifying unit 1722_1.

In step S1706, the message classifying unit 1722_1 may classify the switch transmission mode request message, and store the switch transmission mode request message into the device data unit 1723_1 and the device connection unit 1723_2 of the storage module 1723. In step S1707, the scheduling unit 1724_1 may determine the connection status between the terminal device 1730 and the HMI device 1710 through the device connection unit 1723_2. In step S1708, the scheduling unit 1724_1 may control the message organizing unit 1724_2 according to the time schedule of the preset message push. The scheduling unit 1724_1 may monitor a device connection information of the HMI device 1710 stored in the device connection unit 1723_2 to generate a message push schedule. In step S1709, the message organizing unit 1324_2 may read the aforementioned IoT message and other IoT messages corresponding to other terminal devices from the device data unit 1723_1, and perform message organization to generate an organized message.

The message organizing unit 1724_2 may organize the IoT message of the terminal device 1730 stored in the device data unit 1723_1 to generate an organized message. In step S1710, the message organizing unit 1724_2 may provide the organized message to the device control unit 1722_3. In step S1711, the device control unit 1722_3 may receive the organized message provided by the message organizing unit 1724_2, and transmit the organized message to the transmission module 1721 according to the message push schedule, and subscribe to the first dedicated communication channel for message transmission. In step S1712, the transmission module 1721 may transmit the organized message to the transmission module 1711 of the HMI device 1710 via the first dedicated communication channel. In step S1713, the transmission module 1711 may transmit the organized message to the message application unit 1713_1. The message application unit 1713_1 may classify the organized message and transmit the organized message to the application function module 1714, so that the user may realize the function of monitoring and managing the terminal device 1730 by operating the application function module 1714 of the HMI device 1710. In step S1714, the message application unit 1713_1 may switch the original management device permission of the classification mark to the device connection unit 1712_2, so as to set the HMI device 1710 to cancel the hosting. Therefore, the terminal device 1730 may restore the HMI device 1710 to manage the terminal device 1730 through the cloud device 1720 via a second dedicated communication channel between the terminal device 1730 and the cloud device 1720.

In summary, the IoT system of the disclosure may effectively control and monitor a large number of terminal devices in a situation of a limited number of communication channels. The IoT system of the disclosure may efficiently schedule and dynamically subscribe to the first communication channel to transmit the control command to the cloud device according to the priority sequence of the control command, and may dynamically release the first communication channel that completes the command transport for the next control command to use. In addition, the IoT system of the disclosure may also transmit control commands and emergency control commands that have timed out and have not been transmitted in the form of request control instructions to be transmitted via the dedicated communication channel to effectively avoid control failures, data loss, or delayed control. Moreover, the HMI device of the IoT system may switch to the regional transmission mode to manage and control the terminal device adjacent to the HMI device with lower delay and low power consumption, instead of controlling the terminal device through the cloud device. In addition, the terminal device may also effectively reduce its power consumption after releasing the second dedicated communication channel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An Internet of Things (IoT) system, comprising:
   a plurality of terminal devices, wherein each of the plurality of terminal devices at least comprises a first device connection unit and a first message classifying unit, wherein the first message classifying unit stores switch transmission mode request messages into the first device connection unit, and further determine whether the terminal device has a sub-terminal device;
   a cloud device, communicatively connected to the plurality of terminal devices, wherein the cloud device at least comprises a device data unit, a second device connection unit, and a second message classifying unit, wherein the second message classifying unit is configured to store the switch transmission mode request messages into the device data unit and the second device connection unit; and
   a human machine interface (HMI) device, communicatively connected to the terminal devices via a plurality of first communication channels, and communicatively connected to the cloud device via a first dedicated communication channel,
   wherein the HMI device determines a subscription sequence according to priority information of a plurality of control commands, and schedules and dynamically subscribes to the first communication channels according to the subscription sequence,
   wherein the HMI device respectively determines whether the terminal devices are adjacent to the HMI device, and transmits the switch transmission mode request messages corresponding to the terminal devices adjacent to the HMI device to the cloud device via the first dedicated communication channel.

2. The IoT system according to the claim 1, wherein the terminal devices determined to be adjacent to the HMI device is located in a same communication area as the HMI device.

3. The IoT system according to the claim 1, wherein the HMI device comprises:
   a channel management module, comprises:
      a first device connection unit;
      a channel scheduling unit, comprises a command queue; and
      a first scheduling unit, configured to regularly determine the terminal devices that support transmission mode switching by reading the first device connection unit, and generates a low-priority detection command to the command queue in the channel scheduling unit.

4. The IoT system according to the claim 3, wherein the channel management module further comprises:
   a channel allocating unit,
   wherein the channel scheduling unit is configured to calculate the subscription sequence according to priority information of the control commands, and the channel allocating unit is configured to allocate the first communication channels according to the subscription sequence for the control commands to be transmitted to subscribe to in sequence.

5. The IoT system according to the claim 4, wherein the HMI device further comprises:
   a transmission module, configured to respectively determines whether the terminal devices are adjacent to the HMI device,
   wherein the first scheduling unit further generates a high-priority detection command to the command queue in the channel scheduling unit, so that the first transmission module respectively determines again whether the terminal devices are adjacent to the HMI device, and transmits the switch transmission mode request messages to the terminal devices adjacent to the HMI device via the first communication channels.

6. The IoT system according to the claim 5, wherein each of the terminal devices further comprises:
   a first HMI device management module; and
   a first IoT device management module, comprises:
      the first message classifying unit, configured to receive the switch transmission mode request messages, and determine the switch transmission mode request messages must be responded immediately.

7. The IoT system according to the claim 6, wherein the first IoT device management module further comprises a first device control unit,
   wherein when the terminal device has the sub-terminal device, the first message classifying unit replies to the HMI device to perform a dedicated communication channel mode, and actives the first HMI device management module,
   wherein when the terminal device has no the sub-terminal devices, the first message classifying unit disables the first HMI device management module, replies completion of the switch transmission mode request from the first communication channel through the device control unit to the HMI device, and interrupts a second dedicated communication channel between the cloud device and the terminal device.

8. The IoT system according to the claim 1, wherein the HMI device comprises:
   a channel management module, comprises:
      a device connection unit;
      a channel scheduling unit, comprises a command queue; and
      a first scheduling unit, configured to read information of a managed terminal device recorded in the device connection unit that is in a general communication channel mode, and it has reached the time that should be controlled and managed, and generate a message get command with a medium priority and transmit it to the command queue in the channel scheduling unit.

9. The IoT system according to the claim 1, wherein the HMI device comprises:
- a channel management module, comprises:
  - a channel scheduling unit, comprises a command queue; and
  - an application function module, configured to transmit an enable or disable command of a dedicated communication channel mode with the highest priority to the command queue of the channel scheduling unit, so that the channel scheduling unit subscribe to or release the first dedicated communication channel communicatively connected to the terminal device.

10. The IoT system according to the claim 1, wherein the cloud device comprises:
- a second HMI device management module, comprises:
  - a message organizing unit, configured to determines whether the terminal devices are adjacent to the HMI device,
  - wherein when the message organizing unit determines that the terminal devices exists in the area adjacent to or in the same area as the HMI device, the message organizing unit is configured to collect multiple information detected by the HMI device that multiple terminal devices exist in the adjacent area or in the same area, and organize into an organized message.

11. The IoT system according to the claim 1, wherein at least one of the terminal devices comprises:
- an IoT device management module, comprises:
  - a message monitoring unit,
    when at least one of the terminal devices is managed by the HMI device and the transmission mode is the general communication channel mode, the message monitoring unit is configured to monitor whether the HMI device is not connected to access device data within timeout.

12. The IoT system according to the claim 11, wherein when the message monitoring unit determines that the HMI device is not connected to access device data within timeout, the at least one of the terminal devices restores the HMI device to manage the terminal device through the cloud device via a second dedicated communication channel between the at least one of the terminal devices and the cloud device.

13. The IoT system according to the claim 1, wherein the terminal devices adjacent to the HMI device is switch to be managed by the HMI device instead of the cloud device.

14. The IoT system according to the claim 1, wherein a number of terminal devices is greater than a number of the first communication channels.

15. The IoT system according to the claim 7, wherein the first device control unit replies a near-end connection information to the HMI device, and the HMI device notifies the cloud device that management switch has been completed.

16. The IoT system according to the claim 15, wherein the near-end connection information comprises a device unique code, a managed sub-terminal device, a communication channel information, a transmission mode information and time information of previous control.

17. The IoT system according to the claim 1, wherein the cloud device further comprises:
- a second HMI device management module, comprises:
  - a second scheduling unit, configured to monitor a device connection information of the human machine interface device stored in the device connection unit to generate a message push schedule.

18. The IoT system according to claim 17, wherein the second HMI device management module further comprises:
- a message organizing unit, configured to organize the IoT messages of the terminal devices stored in the second device data unit to generate an organized message.

19. The IoT system according to claim 18, wherein the terminal device management module further comprises:
- a second device control unit, configured to receive the organized message provided by the message organizing unit, and transmit the organized message to the HMI device via the first dedicated communication channel according to the message push schedule.

* * * * *

UNITED STATES PATENT AND TRADEMARK OFFICE
CERTIFICATE OF CORRECTION

| | | |
|---|---|---|
| PATENT NO. | : 12,107,921 B2 | Page 1 of 1 |
| APPLICATION NO. | : 18/306238 | |
| DATED | : October 1, 2024 | |
| INVENTOR(S) | : Yun Han Yang et al. | |

It is certified that error appears in the above-identified patent and that said Letters Patent is hereby corrected as shown below:

On the Title Page

Item (30) add Foreign Application Priority Data: August 13, 2021 (TW) ….. 110129999

Signed and Sealed this
Twenty-sixth Day of November, 2024

Katherine Kelly Vidal
*Director of the United States Patent and Trademark Office*